(12) United States Patent
Li et al.

(10) Patent No.: US 12,142,274 B2
(45) Date of Patent: Nov. 12, 2024

(54) VOICE WAKEUP METHOD AND DEVICE

(71) Applicant: HUAWEI TECHNOLOGIES CO., LTD., Guangdong (CN)

(72) Inventors: Shuwei Li, Xi'an (CN); Xiang Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 575 days.

(21) Appl. No.: 17/607,390

(22) PCT Filed: May 15, 2020

(86) PCT No.: PCT/CN2020/090489
§ 371 (c)(1),
(2) Date: Oct. 28, 2021

(87) PCT Pub. No.: WO2020/228815
PCT Pub. Date: Nov. 19, 2020

(65) Prior Publication Data
US 2022/0223150 A1 Jul. 14, 2022

(30) Foreign Application Priority Data
May 16, 2019 (CN) .......................... 201910407712.8

(51) Int. Cl.
*G10L 15/22* (2006.01)
*G10L 15/08* (2006.01)
*G10L 21/0216* (2013.01)

(52) U.S. Cl.
CPC .............. *G10L 15/22* (2013.01); *G10L 15/08* (2013.01); *G10L 2015/088* (2013.01); *G10L 2015/223* (2013.01); *G10L 21/0216* (2013.01)

(58) Field of Classification Search
CPC ..... G10L 15/22; G10L 15/08; G10L 21/0216; G10L 2015/088; G10L 2015/223
(Continued)

(56) References Cited

U.S. PATENT DOCUMENTS 10,001,829 B2 6/2018 Cottinet et al.
2005/0071160 A1 3/2005 Huang
(Continued)

FOREIGN PATENT DOCUMENTS

CN 105788599 A 7/2016
CN 106161755 A 11/2016
(Continued)

OTHER PUBLICATIONS

Kepuska et al., "A novel wake-up-word speech recognition system, wake-up-word recognition task, technology and evaluation", Nolinear Analysis 71 (2009) e2772-2789 (Year: 2009).*

*Primary Examiner* — Tsu-Chang Lee
(74) *Attorney, Agent, or Firm* — HUAWEI TECHNOLOGIES CO., LTD.

(57) ABSTRACT

A voice wakeup method and a device are provided. The method includes: receiving, by a third-party device, wakeup messages sent by at least two electronic devices, where the wakeup message includes wakeup keyword energy information used to indicate a wakeup keyword energy value, and the wakeup keyword energy value; normalizing wakeup keyword energy values based on ambient sound energy and/or sound collection capabilities of devices, to obtain at least two normalized wakeup keyword energy values; and based on the at least two normalized wakeup keyword energy values, sending a wakeup permission instruction to a first electronic device in the at least two electronic devices, and sending a wakeup prohibition instruction to another electronic device other than the first electronic device, where a normalized wakeup keyword energy value of the first electronic device is a maximum value. This helps improve accuracy of waking up a device nearby in a multi-device scenario.

20 Claims, 10 Drawing Sheets

(58) Field of Classification Search
USPC .......................................................... 704/275
See application file for complete search history.

(56) References Cited

U.S. PATENT DOCUMENTS

| | | | |
|---|---|---|---|
| 2017/0162205 A1 | 6/2017 | Melvin et al. | |
| 2018/0254041 A1 | 9/2018 | Harper | |
| 2018/0365695 A1* | 12/2018 | Liu | G10L 15/22 |
| 2019/0147904 A1 | 5/2019 | Tao et al. | |
| 2019/0341049 A1 | 11/2019 | Cheng et al. | |

FOREIGN PATENT DOCUMENTS

| | | |
|---|---|---|
| CN | 106356067 A | 1/2017 |
| CN | 107393555 A | 11/2017 |
| CN | 107577449 A | 1/2018 |
| CN | 107919119 A | 4/2018 |
| CN | 108073381 A | 5/2018 |
| CN | 108694959 A | 10/2018 |
| CN | 108712566 A | 10/2018 |
| CN | 109036412 A | 12/2018 |
| CN | 109215663 A | 1/2019 |
| CN | 109377987 A | 2/2019 |
| CN | 109391528 A | 2/2019 |
| CN | 109450750 A | 3/2019 |
| CN | 110223684 A | 9/2019 |

\* cited by examiner

VOICE WAKEUP METHOD AND DEVICE

CROSS-REFERENCE TO RELATED APPLICATIONS

This application is a national stage of International Application No. PCT/CN2020/090489, filed on May 15, 2020, which claims priority to Chinese Patent Application No. 201910407712.8, filed on May 16, 2019. Both of the aforementioned applications are hereby incorporated by reference in their entireties.

TECHNICAL FIELD

This application relates to the field of terminal technologies, and in particular, to a voice wakeup method and a device.

BACKGROUND

Currently, a user may wake up an electronic device by speaking a "wakeup keyword", to implement interaction between the user and the electronic device. Generally, the wakeup keyword is preset by the user in the electronic device, or the wakeup keyword is set before delivery of the electronic device. Therefore, preset wakeup keywords in different electronic devices may be the same. However, in a multi-device scenario (such as a smart home scenario), a same wakeup keyword may be set in a plurality of electronic devices, for example, a television, a sound box, and an alarm clock. After a user speaks the "wakeup keyword", the plurality of electronic devices may be woken up and interact with the user at the same time. This easily troubles the user, and affects user experience.

SUMMARY

Embodiments of this application provide a voice wakeup method and a device, to help improve accuracy of waking up an electronic device nearby in a multi-device scenario, thereby improving user experience.

According to a first aspect, an embodiment of this application provides a voice wakeup method. The method includes:

A third-party device receives wakeup messages sent by at least two electronic devices. Each of the wakeup messages sent by the at least two electronic devices includes wakeup keyword energy information, the wakeup keyword energy information is used to indicate a wakeup keyword energy value, and the wakeup keyword energy value is a magnitude of audio data received energy of an electronic device in a time period in which a wakeup keyword is located. Then the third-party device normalizes a wakeup keyword energy value of each of the at least two electronic devices based on at least one of ambient sound energy and a sound collection capability of the device, to obtain at least two normalized wakeup keyword energy values. Based on the at least two normalized wakeup keyword energy values, the third-party device sends a wakeup permission instruction to a first electronic device in the at least two electronic devices, and sends a wakeup prohibition instruction to another electronic device in the at least two electronic devices other than the first electronic device. A normalized wakeup keyword energy value of the first electronic device is a maximum value of the at least two normalized wakeup keyword energy values.

In this embodiment of this application, the third-party device can normalize a wakeup keyword energy value. This helps reduce impact of an ambient sound and/or a sound collection capability of a device on the wakeup keyword energy value, and helps improve accuracy of waking up a device nearby in a multi-device scenario.

In a possible design, the third-party device normalizes, for any one of the at least two electronic devices, a wakeup keyword energy value of the electronic device based on a device compensation factor of the electronic device, to obtain a normalized wakeup keyword energy value. The device compensation factor is used to indicate a sound collection capability of the electronic device. This helps simplify an implementation.

In some embodiments, the normalized wakeup keyword energy value satisfies the following expression:

$E_{normalize} = \theta \times E_{wakeup}$, where $E_{normalize}$ is the normalized wakeup keyword energy value, $E_{wakeup}$ is the wakeup keyword energy value, and $\theta$ is the device compensation factor.

In a possible design, the third-party device normalizes, for any one of the at least two electronic devices, a wakeup keyword energy value of the electronic device based on ambient sound energy information of the electronic device, to obtain a normalized wakeup keyword energy value. The ambient sound energy information is used to indicate an ambient sound energy value, and is carried in a wakeup message of the electronic device and sent to the third-party device, the ambient sound energy value is a magnitude of audio data received energy in an ambient sound time window, and a duration of the ambient sound time window is greater than a duration of the time period in which the wakeup keyword is located. This helps simplify an implementation.

In a possible design, the normalized wakeup keyword energy value satisfies the following expression:

$E_{normalize} = E_{wakeup} \pm \lambda \times E_{ambient}$, where $E_{normalize}$ is the normalized wakeup keyword energy value, $E_{wakeup}$ is the wakeup keyword energy value, $E_{ambient}$ is the ambient sound energy value, $\lambda$ is an ambient impact factor, and the ambient impact factor is used to indicate a degree of impact of the audio data received energy of the ambient sound on audio data received energy of the wakeup keyword.

In a possible design, the third-party device normalizes, for any one of the at least two electronic devices, a wakeup keyword energy value of the electronic device based on ambient sound energy information of the electronic device and a device compensation factor of the electronic device, to obtain a normalized wakeup keyword energy value. The ambient sound energy information is used to indicate an ambient sound energy value, and is carried in a wakeup message of the electronic device and sent to the third-party device, the ambient sound energy value is a magnitude of audio data received energy in an ambient sound time window, a duration of the ambient sound time window is greater than a duration of the time period in which the wakeup keyword is located, and the device compensation factor is used to indicate a sound collection capability of the electronic device. This helps simplify an implementation.

In a possible design, the normalized wakeup keyword energy value satisfies the following expression:

$E_{normalize} = \theta \times (E_{wakeup} \pm \lambda \times E_{ambient})$, where $E_{normalize}$ is the normalized wakeup keyword energy value, $E_{wakeup}$ is the wakeup keyword energy value, $E_{ambient}$ is the ambient sound energy value, θ is the device compensation factor, λ is an ambient impact factor, and the ambient impact factor is used to indicate a degree of impact of the audio data received energy of the ambient sound on audio data received energy of the wakeup keyword.

In a possible design, the device compensation factor is carried in the wakeup message and sent to the third-party device by the electronic device. This helps simplify processing steps of the third-party device.

In a possible design, the device compensation factor is preconfigured in the third-party device. This helps reduce signaling overheads.

In a possible design, the device compensation factor is determined by the third-party device based on a use duration of the electronic device. This helps improve accuracy of indicating the sound collection capability of the device.

In a possible design, the ambient impact factor is carried in the wakeup message and sent to the third-party device by the electronic device. This helps improve flexibility.

In a possible design, the ambient impact factor is preconfigured in the third-party device. This helps reduce signaling overheads.

In a possible design, the third-party device determines, from at least two wakeup keyword energy value normalization algorithms, a wakeup keyword energy value normalization algorithm used to normalize wakeup keyword energy values of the at least two electronic devices. This helps improve flexibility of wakeup keyword energy value normalization.

In a possible design, the wakeup messages sent by the at least two electronic devices are received by the third-party device before timing of a timer ends, and the third-party device starts the timer after receiving, for the first time, a wakeup message sent by one of the at least two electronic devices. This helps simplify an implementation.

In a possible design, the at least two electronic devices are connected to a same local area network and/or the at least two electronic devices are prebound to a same user account. This helps distinguish different multi-device scenarios, and improve accuracy of waking up a device nearby in a multi-device scenario.

In a possible design, the third-party device is a server or a network device.

According to a second aspect, an embodiment of this application provides a voice wakeup method. The method includes:

An electronic device collects an ambient sound in real time, converts the collected ambient sound into audio data, and then performs wakeup keyword detection based on the audio data. The electronic device sends a wakeup message to a third-party device when a wakeup keyword is detected. The wakeup message includes wakeup keyword energy information and ambient sound energy information, the wakeup keyword energy information is used to indicate a wakeup keyword energy value, the wakeup keyword energy value is a magnitude of audio data received energy of the electronic device in a time period in which the wakeup keyword is located, the ambient sound energy information is used to indicate an ambient sound energy value, the ambient sound energy value is an average value of audio data received energy at Q sampling moments in an ambient sound time window, and Q is a positive integer.

The electronic device receives a wakeup instruction that is sent by the third-party device based on the wakeup message.

The electronic device wakes up when the wakeup instruction is a wakeup permission instruction; and does not wake up when the wakeup instruction is a wakeup prohibition instruction.

In this embodiment of this application, the electronic device can send the ambient sound energy information to the third-party device by using the wakeup message, so that the third-party device can normalize the wakeup keyword energy value based on the ambient sound energy information. This helps reduce impact of the ambient sound on the wakeup keyword energy value, and helps improve accuracy of waking up a device nearby in a multi-device scenario.

In a possible design, the wakeup message further includes an ambient impact factor and/or a device compensation factor, the ambient impact factor is used to indicate a degree of impact of audio data received energy of the ambient sound on the audio data received energy of the wakeup keyword, and the device compensation factor is used to indicate a sound collection capability of the electronic device. The foregoing technical solution helps further improve the accuracy of waking up a device nearby in a multi-device scenario.

According to a third aspect, an embodiment of this application provides another voice wakeup method. The method includes:

A first electronic device collects an ambient sound in real time, converts the collected ambient sound into audio data, and then performs wakeup keyword detection based on the audio data. When a wakeup keyword is detected, the first electronic device broadcasts a first wakeup message, starts a timer, and listens to, before timing of the timer ends, a second wakeup message broadcast by a second electronic device. The first wakeup message includes first wakeup keyword energy information, the first wakeup keyword energy information is used to indicate a first wakeup keyword energy value, the first wakeup keyword energy value is a magnitude of audio data received energy of the first electronic device in a time period in which the wakeup keyword is located, the second wakeup message includes second wakeup keyword energy information, the second wakeup keyword energy information is used to indicate a second wakeup keyword energy value, and the second wakeup keyword energy value is a magnitude of audio data received energy of the second electronic device in the time period in which the wakeup keyword is located.

When at least one second wakeup message is received in a time period from when the timing of the timer starts to when the timing of the timer ends, the first electronic device normalizes, based on ambient sound energy and/or sound collection capabilities of devices, a second wakeup keyword energy value included in the at least one second wakeup message and the first wakeup keyword energy value, to obtain at least one normalized second wakeup keyword energy value and a normalized first wakeup keyword energy value.

The first electronic device wakes up when the at least one normalized second wakeup keyword energy value is less than the normalized first wakeup keyword energy value; and does not wake up when the normalized first wakeup keyword energy value is less than one or more of the at least one normalized second wakeup keyword energy value.

In this embodiment of this application, the first electronic device can normalize a wakeup keyword energy value. This helps reduce impact of an ambient sound and/or a sound collection capability of a device on the wakeup keyword energy value, and helps improve accuracy of waking up a device nearby in a multi-device scenario.

According to a fourth aspect, an embodiment of this application provides a device, including one or more processors and memories. The memory stores program instructions, and when the program instructions are executed by the device, the method in the foregoing aspects and any possible design of the aspects in the embodiments of this application is implemented.

According to a fifth aspect, an embodiment of this application provides a chip. The chip is coupled to a memory in a device, so that the chip invokes, during running, program instructions stored in the memory, to implement the method in the foregoing aspects and any possible design of the aspects in the embodiments of this application.

According to a sixth aspect, an embodiment of this application provides a computer storage medium. The computer storage medium stores program instructions. When the program instructions are run on an electronic device, the device is enabled to perform the method in the foregoing aspects and any possible design of the aspects in the embodiments of this application.

According to a seventh aspect, an embodiment of this application provides a computer program product. When the computer program product runs on an electronic device, the electronic device is enabled to perform the method in the foregoing aspects and any possible design of the aspects in the embodiments of this application.

In addition, for technical effects brought by any possible design manner in the fourth aspect to the seventh aspect, refer to technical effects brought by different related design manners in the method part. Details are not described herein again.

DESCRIPTION OF EMBODIMENTS

It should be understood that, in this application, "/" means "or" unless otherwise specified. For example, A/B may represent A or B. In this application, "and/or" describes only an association relationship between associated objects and represents that three relationships may exist. For example, A and/or B may represent the following three cases: Only A exists, both A and B exist, and only B exists. "At least one" means one or more, and "a plurality of" means two or more.

In this application, "for example", "in some embodiments", "in some other embodiments", and the like are used to represent examples, exemplifications, or illustrations. Any embodiment or design scheme described as an "example" in this application should not be explained as being more preferred or having more advantages than another embodiment or design scheme. Exactly, "for example" is used to present a concept in a specific manner.

In addition, terms such as "first" and "second" in this application are merely used for distinction and description, and shall not be understood as an indication or implication of relative importance or implicit indication of a quantity of indicated technical features, or an indication or implication of an order.

An electronic device in the embodiments of this application is an electronic device having a voice wakeup function, that is, a user may wake up the electronic device by using a voice. Specifically, the user wakes up the electronic device by speaking a "wakeup keyword". The wakeup keyword may be preset by the user in the electronic device based on a requirement of the user, or may be set before delivery of the electronic device. A manner of setting the wakeup keyword is not limited in the embodiments of this application. It should be noted that, in the embodiments of this application, the electronic device may be woken up by any user or may be woken up by a specified user. For example, the specified user may be a user who prestores, in the electronic device, a sound of speaking the wakeup keyword, such as an owner.

Figure 1:
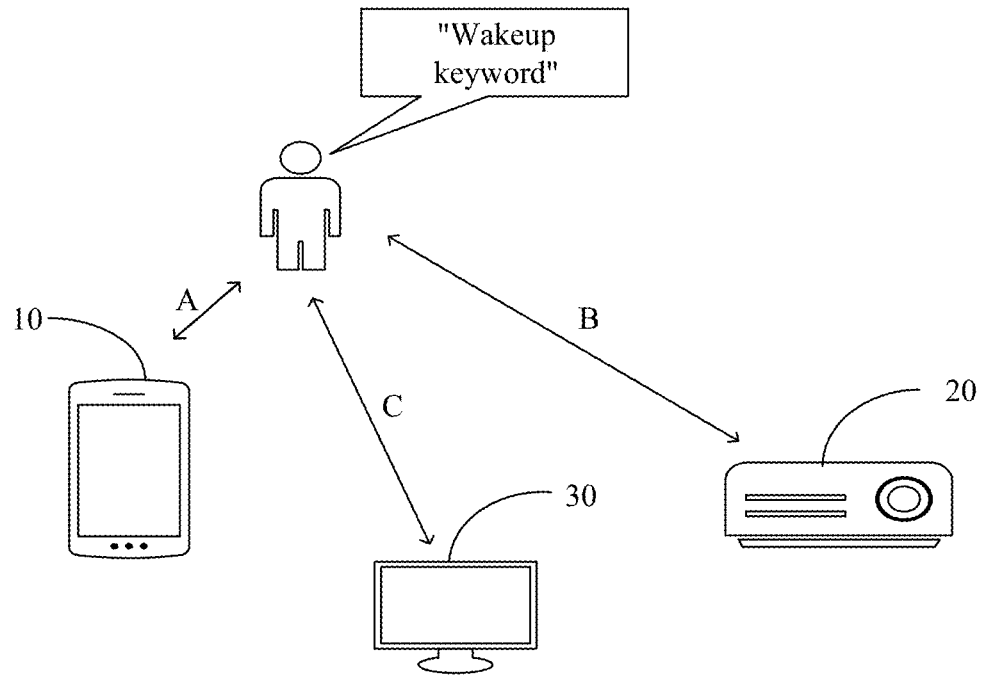
FIG. 1 is a schematic diagram of a multi-device scenario according to an embodiment of this application.

Currently, the electronic device determines, by detecting whether first audio data includes the wakeup keyword, whether to wake up. Specifically, when the first audio data includes the wakeup keyword, the electronic device wakes up; otherwise, the electronic device does not wake up. After the electronic device wakes up, the user may interact with the electronic device by using a voice. For example, the wakeup keyword is "Xiaoyi Xiaoyi". When it is detected that the first audio data includes "Xiaoyi Xiaoyi", the electronic device wakes up. The electronic device obtains the first audio data by collecting or receiving an ambient sound. However, in a multi-device scenario (for example, a smart home scenario), the sound of speaking the "wakeup keyword" by the user may be received or collected by a plurality of electronic devices. As a result, two or more electronic devices wake up, causing confusion that the user does not know which device to perform voice interaction with, thereby degrading user experience. For example, FIG. 1 is a schematic diagram of a multi-device scenario. Specifically, in the multi-device scenario shown in FIG. 1, a wakeup keyword preset in an electronic device 10 is a wakeup keyword 1, a wakeup keyword preset in an electronic device 20 is the wakeup keyword 1, and a wakeup keyword preset in an electronic device 30 is a wakeup keyword 2. A distance between a user and the electronic device 10 is A, a distance between the user and the electronic device 20 is B, and a distance between the user and the electronic device 30 is C. When a wakeup keyword spoken by the user is the wakeup keyword 1, the electronic device 10, the electronic device 20, and the electronic device 30 can collect or receive the wakeup keyword. In an existing voice wakeup method, when the electronic device 10 and the electronic device 20 collect a sound of speaking the wakeup keyword 1 by the user, the electronic device 10 and the electronic device 20 may detect the wakeup keyword 1 spoken by the user, and both wake up. When receiving or collecting the sound of speaking the wakeup keyword 1 by the user, the electronic device 30 may also detect the wakeup keyword 1 spoken by the user. However, because the wakeup keyword preset in the electronic device 30 is the wakeup keyword 2, the electronic device 30 does not wake up. It should be noted that FIG. 1 is merely an example of a multi-device scenario. In the embodiments of this application, a quantity of electronic devices in a multi-device scenario is not limited, and a wakeup keyword preset in an electronic device is not limited.

Therefore, when the existing voice wakeup method is applied to the multi-device scenario, confusion that the user does not know which device to perform voice interaction with is easily caused, thereby degrading user experience. In view of this, an embodiment of this application provides a voice wakeup method, so that when it is detected that first audio data includes a wakeup keyword, an electronic device may send wakeup keyword energy information to a third-party device, and the third-party device determines, based on wakeup keyword energy information of at least one electronic device, which electronic device is to be woken up. This helps reduce a probability of waking up a plurality of electronic devices in a multi-device scenario, thereby improving user experience. The first audio data is obtained by the electronic device based on a collected ambient sound. The wakeup keyword energy information is used to indicate a magnitude of audio data received energy in a time period in which the wakeup keyword is located.

For example, during specific implementation, the wakeup keyword energy information may be a wakeup keyword energy value, or may be information used to indicate the wakeup keyword energy value. The wakeup keyword energy value is the magnitude of the audio data received energy in the time period in which the wakeup keyword is located. For example, the wakeup keyword energy information is an index of the wakeup keyword energy value. The index of the wakeup keyword energy value and the wakeup keyword energy value may satisfy an algorithm. For example, $E_{index}=E_{wakeup}/C$, where $E_{wakeup}$ is the wakeup keyword energy value, $E_{index}$ is the index of the wakeup keyword energy value, and C is a constant. It should be noted that a value of C may be set as required, for example, 10, 50, or 100. This is not limited. It should be understood that the foregoing description is merely an example. In this embodiment of this application, the wakeup keyword energy information may alternatively be other information used to indicate the wakeup keyword energy value.

In some embodiments, the electronic device may calculate, in a short-time energy manner, the magnitude of the audio data received energy in the time period in which the wakeup keyword is located, to obtain the wakeup keyword energy information. For example, generally, a smaller distance between the electronic device and a user (namely, a wakeup source) who makes a sound of the wakeup keyword indicates greater audio data received energy of the electronic device in the time period in which the wakeup keyword is located. Therefore, the third-party device may determine, based on wakeup keyword energy information of different electronic devices, to wake up an electronic device having maximum audio data received energy in the time period in which the wakeup keyword is located. This helps wake up a device nearby in a multi-device scenario, thereby improving accuracy of voice wakeup.

It may be understood that, in this embodiment of this application, the third-party device may be a server (such as a cloud server or a general-purpose server), a network device, or an electronic device. For example, in a smart home scenario, the third-party device may be a router accessed by a plurality of smart home devices, or may be a cloud server or an electronic device.

Figure 2:
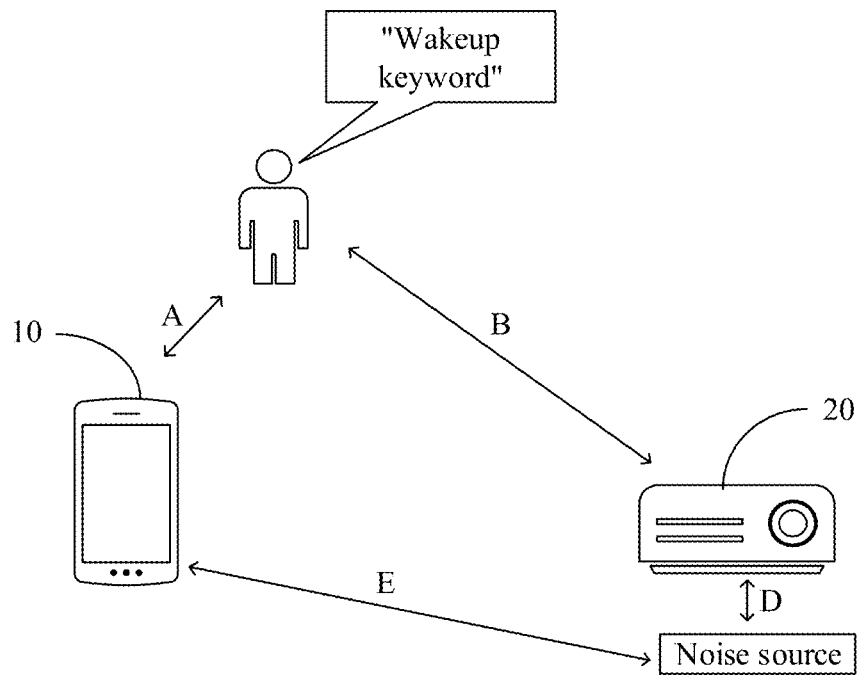
FIG. 2 is a schematic diagram of another multi-device scenario according to an embodiment of this application.

However, due to one or more factors such as ambient noise, a device hardware capability, an ambient temperature, an ambient humidity, a device placement position, and a distance between devices, the magnitude, indicated by the wakeup keyword energy information, of the audio data received energy in the time period in which the wakeup keyword is located cannot accurately measure a magnitude of the distance between the electronic device and the wakeup source (the user who makes the sound of the wakeup keyword), which easily reduces accuracy of waking up a device nearby in a multi-device scenario. The ambient noise is used as an example. As shown in FIG. 2, a distance between an electronic device 10 and a wakeup source is A, a distance between the electronic device 10 and a noise source is E, a distance between an electronic device 20 and the wakeup source is B, and a distance between the electronic device 20 and the noise source is D. If D<A<B<E, a magnitude, determined by the electronic device 20, of audio data received energy in a time period in which a wakeup keyword is located may be greater than a magnitude, determined by the electronic device 10, of audio data received energy in the time period in which the wakeup keyword is located. As a result, the electronic device 20 is woken up, and the electronic device 10 is not woken up.

For example, in this embodiment of this application, the magnitude, indicated by the wakeup keyword energy information, of the audio data received energy in the time period in which the wakeup keyword is located may be normalized with reference to an actual situation, and then which electronic device is to be woken up may be determined based on a normalized magnitude of the audio data received energy in the time period in which the wakeup keyword is located. In this embodiment of this application, the magnitude of the audio data received energy in the time period in which the wakeup keyword is located is normalized with reference to an actual situation. This helps reduce impact of ambient noise, a device hardware capability, an ambient temperature, an ambient humidity, and the like on the audio data received energy in the time period in which the wakeup keyword is located, and helps improve accuracy of waking up a device nearby in a multi-device scenario.

An electronic device, a graphical user interface (GUI) for such an electronic device, and an embodiment for using such an electronic device are described below. For ease of description, the GUI is referred to as a user interface below.

The electronic device in the embodiments of this application may be a portable electronic device, such as a mobile phone, a tablet computer, an artificial intelligence (artificial intelligence, AI) intelligent voice terminal, a wearable device, an augmented reality (augmented reality, AR)/virtual reality (virtual reality, VR) device, or the like. An example embodiment of a portable electronic device includes but is not limited to a portable electronic device using IOS®, Android®, Microsoft®, or another operating system. The portable electronic device may be an in-vehicle terminal, a laptop (laptop), or the like. It should be further understood that the electronic device in the embodiments of this application may alternatively be a desktop computer, a smart home device (for example, a smart television or a smart speaker), or the like. This is not limited.

Figure 3:
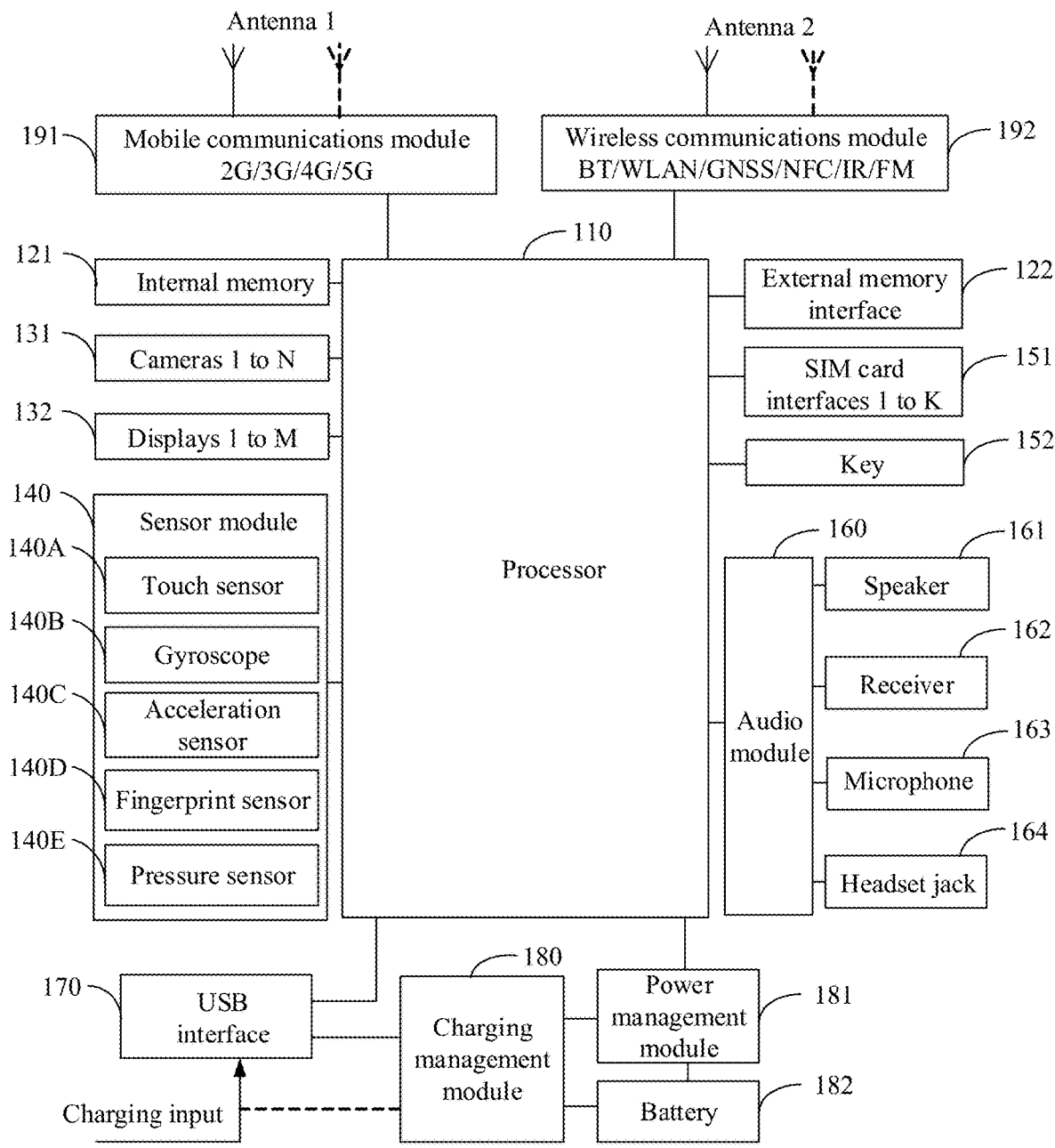
FIG. 3 is a schematic diagram of a structure of hardware of an electronic device according to an embodiment of this application.

For example, FIG. 3 is a schematic diagram of a structure of hardware of an electronic device according to an embodiment of this application. Specifically, as shown in the figure, the electronic device includes a processor 110, an internal memory 121, an external memory interface 122, a camera 131, a display 132, a sensor module 140, and a subscriber identity module (subscriber identity module, SIM) card interface 151, a key 152, an audio module 160, a speaker 161, a receiver 162, a microphone 163, a headset jack 164, a universal serial bus (universal serial bus, USB) interface 170, a charging management module 180, a power management module 181, a battery 182, a mobile communications module 191, and a wireless communications module 192. In some other embodiments, the electronic device may further include a motor, an indicator, a button, and the like.

It should be understood that the hardware structure shown in FIG. 3 is merely an example. The electronic device in this embodiment of this application may have more or fewer components than the electronic device shown in the figure, may combine two or more components, or may have different component configurations. The components shown in the figure may be implemented in hardware, software, or a combination of hardware and software, including one or more signal processors and/or application specific integrated circuits.

The processor 110 may include one or more processing units. For example, the processor 110 may include an application processor (application processor, AP), a modem, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent devices, or may be integrated into one or more processors.

In some embodiments, a buffer may be further disposed in the processor 110, to store instructions and/or data. For example, the buffer in the processor 110 may be a cache. The buffer may be configured to store instructions and/or data that are/is just used, generated, or recycled by the processor 110. If the processor 110 needs to use the instructions or the data, the instructions or the data may be invoked directly from the buffer. This helps reduce a time for the processor 110 to obtain the instructions or the data, and helps improve system efficiency.

The internal memory 121 may be configured to store a program and/or data. In some embodiments, the internal memory 121 includes a program storage area and a data storage area. The program storage area may be configured to store an operating system (for example, an operating system such as Android or iOS), a computer program (such as a voice wakeup function and a voice playing function) required by at least one function, and the like. The data storage area may be configured to store data (such as audio data) created and/or collected in a process of using the electronic device. For example, the processor 110 may invoke the program and/or the data stored in the internal memory 121, so that the electronic device performs a corresponding method, to implement one or more functions. For example, the processor 110 invokes some programs and/or data in the internal memory, so that the electronic device performs the voice wakeup method provided in the embodiments of this application, to implement a voice wakeup function. The internal memory 121 may use a high-speed random-access memory, a non-volatile memory, and/or the like. For example, the non-volatile memory may include at least one of one or more disk memory devices, flash memory devices, and/or universal flash storages (universal flash storages, UFS).

The external memory interface 122 may be configured to connect to an external memory card (for example, a Micro SD card), to expand a storage capability of the electronic device. The external memory card communicates with the processor 110 by using the external memory interface 122, to implement a data storage function. For example, the electronic device may store files such as images, music, and videos in the external memory card by using the external memory interface 122.

The camera 131 may be configured to capture dynamic and static images and the like. Generally, the camera 131 includes a lens and an image sensor. An optical image generated by an object through the lens is projected onto the image sensor, and then converted into an electrical signal for subsequent processing. For example, the image sensor may be a charge coupled device (CCD) or a complementary metal-oxide-semiconductor (complementary metal-oxide-semiconductor, CMOS) phototransistor. The image sensor converts an optical signal into an electrical signal, and then transmits the electrical signal to the ISP to convert the electrical signal into a digital image signal. It should be noted that the electronic device may include one or N cameras 131, and N is a positive integer greater than 1.

The display 132 may include a display panel, configured to display a user interface. The display panel may use a liquid crystal display (liquid crystal display, LCD), an organic light-emitting diode (organic light-emitting diode, OLED), an active-matrix organic light-emitting diode (active-matrix organic light-emitting diode, AMOLED), a flex light-emitting diode (flex light-emitting diode, FLED), a Mini-Led, a Micro-Led, a Micro-oLed, a quantum dot light-emitting diode (quantum dot light-emitting diode, QLED), or the like. It should be noted that the electronic device may include one or M displays 132, and M is a positive integer greater than 1. For example, the electronic device may implement a display function by using the GPU, the display 132, the application processor, and the like.

The sensor module 140 may include one or more sensors, for example, a touch sensor 140A, a gyroscope 140B, an acceleration sensor 140C, a fingerprint sensor 140D, and a pressure sensor 140E. In some embodiments, the sensor module 140 may further include an ambient light sensor, a distance sensor, a proximity sensor, a bone conduction sensor, a temperature sensor, and the like.

The touch sensor 140A may also be referred to as a "touch panel". The touch sensor 140A may be disposed on the display 132. The touch sensor 140A and the display 132 constitute a touchscreen, also referred to as a "touch control screen". The touch sensor 140A is configured to detect a touch operation on or near the touch sensor. The touch sensor 140A may transfer the detected touch operation to the application processor to determine a type of a touch event. The electronic device may provide, by using the display 132, a visual output related to a touch operation, and the like. In some other embodiments, the touch sensor 140A may alternatively be disposed on a surface of the electronic device and at a position different from that of the display 132.

The gyroscope 140B may be configured to determine a motion posture of the electronic device. In some embodiments, angular velocities of the electronic device around three axes (x, y, and z axes) may be determined by using the gyroscope 140B. The gyroscope 140B may be configured for image stabilization during photographing. For example, when a shutter is pressed, the gyroscope 140B detects an angle at which the electronic device jitters, and calculates, based on the angle, a distance for which the lens needs to compensate, so that the lens offsets the jitter of the electronic device through reverse motion, to implement image stabilization. The gyroscope 140B may be further used in navigation and motion sensing game scenarios.

The acceleration sensor 140C may detect magnitudes of accelerations in different directions (generally on three axes) of the electronic device, and may detect a magnitude and a direction of gravity when the electronic device is stationary. The acceleration sensor 140C may be further configured to recognize a posture of the electronic device, which is applied to landscape-portrait switching, a pedometer, or other applications.

The fingerprint sensor 140D is configured to collect a fingerprint. The electronic device may implement fingerprint-based unlocking, application access locking, fingerprint-based photographing, fingerprint-based call answering, and the like by using a feature of the collected fingerprint.

The pressure sensor 140E is configured to sense a pressure signal, and may convert the pressure signal into an electrical signal. For example, the pressure sensor 140E may be disposed on the display 132. Touch operations that are applied to a same touch position but have different touch operation intensities may correspond to different operation instructions.

The SIM card interface 151 is configured to connect to a SIM card. The SIM card may be inserted into the SIM card interface 151 or removed from the SIM card interface 151 to implement contact with and separation from the electronic device. The electronic device may support one or K SIM card interfaces 151, and K is a positive integer greater than 1. The SIM card interface 151 may support a nano-SIM card, a micro-SIM card, a SIM card, and/or the like. A plurality of cards may be inserted into a same SIM card interface 151 at the same time. Types of the plurality of cards may be the same or may be different. The SIM card interface 151 may also be compatible with different types of SIM cards. The SIM card interface 151 may also be compatible with an external memory card. The electronic device interacts with a network by using a SIM card, to implement call, data communication, and other functions. In some embodiments, the electronic device may further use eSIM, that is, an embedded SIM card. The eSIM card may be embedded in the electronic device and cannot be detached from the electronic device.

The key 152 may include a power key, a volume key, and the like. The key 152 may be a mechanical key or a touch key. The electronic device may receive a key input, generate a key signal input that is related to user setting and function control of the electronic device.

The electronic device may implement an audio function by using the audio module 160, the speaker 161, the receiver 162, the microphone 163, the headset jack 164, the application processor, and the like, for example, an audio playing function, a recording function, and a voice wakeup function.

The audio module 160 may be configured to perform digital-to-analog conversion and/or analog-to-digital conversion on audio data, and may be further configured to encode and/or decode the audio data. For example, the audio module 160 may be disposed independent of the processor, or may be disposed in the processor 110, or some function modules of the audio module 160 may be disposed in the processor 110.

The speaker 161, also referred to as a "horn", is configured to convert audio data into a sound and play the sound. For example, the electronic device 100 may be used to listen to music, answer a hands-free call, or give a voice prompt by using the speaker 161.

The receiver 162, also referred to as an "earpiece", is configured to convert audio data into a sound and play the sound. For example, when the electronic device 100 is used to answer a call, the receiver 162 may be placed close to a human ear to answer the call.

The microphone 163, also referred to as a "mic" or a "mike", is configured to collect a sound (for example, an ambient sound, including a sound made by a person, a sound made by a device, and the like) and convert the sound into audio electrical data. When making a call or sending a voice, a user may make a sound with the mouth approaching the microphone 163, and the microphone 163 collects the sound made by the user. When the voice wakeup function of the electronic device is enabled, the microphone 163 may collect an ambient sound in real time, to obtain audio data. A situation in which the microphone 163 collects a sound is related to an environment in which the microphone is located. For example, when an ambient environment is relatively noisy, and the user speaks a wakeup keyword, a sound collected by the microphone 163 includes ambient noise and a sound of speaking the wakeup keyword by the user. For another example, when the ambient environment is relatively quiet, and the user speaks the wakeup keyword, a sound collected by the microphone 163 is a sound of speaking the wakeup keyword by the user. For another example, when the ambient environment is relatively noisy, the voice wakeup function of the electronic device is enabled, but the user does not speak the wakeup keyword to wake up the electronic device, a sound collected by the microphone 163 is only ambient noise.

It should be noted that at least one microphone 163 may be disposed in the electronic device. For example, two microphones 163 may be disposed in the electronic device, to implement a noise reduction function, in addition to sound collection. For another example, three, four, or more microphones 163 may alternatively be disposed in the electronic device, to implement a sound source recognition or directional recording function or the like while implementing sound collection and noise reduction.

The headset jack 164 is configured to connect to a wired headset. The headset jack 164 may be a USB interface 170, or may be a 3.5 mm open mobile terminal platform (open mobile terminal platform, OMTP) standard interface, a cellular telecommunications industry association of the USA (cellular telecommunications industry association of the USA, CTIA) standard interface, or the like.

The USB interface 170 is an interface that complies with a USB standard specification, and may be specifically a Mini USB interface, a Micro USB interface, a USB Type C interface, or the like. The USB interface 170 may be configured to connect to a charger to charge the electronic device, and may also be configured to transmit data between the electronic device and a peripheral device. The USB interface may also be configured to connect to a headset, to play audio by using the headset. For example, in addition to serving as a headset jack 164, the USB interface 170 may be further configured to connect to another electronic device, for example, an AR device or a computer.

The charging management module 180 is configured to receive a charging input from a charger. The charger may be a wireless charger, or may be a wired charger. In some embodiments of wired charging, the charging management module 180 may receive a charging input of the wired charger by using the USB interface 170. In some embodiments of wireless charging, the charging management module 180 may receive a wireless charging input by using a wireless charging coil of the electronic device. When charging the battery 182, the charging management module 180 may further supply power for the electronic device by using the power management module 180.

The power management module 181 is configured to connect the battery 182, the charging management module 180, and the processor 110. The power management module 181 receives an input from the battery 182 and/or the charging management module 180, and supplies power to the processor 110, the internal memory 121, the display 132, the camera 131, and the like. The power management module 181 may be further configured to monitor parameters such as a battery capacity, a battery cycle count, and a state of health (leakage or impedance) of the battery. In some other embodiments, the power management module 181 may alternatively be disposed in the processor 110. In some other embodiments, the power management module 181 and the charging management module 180 may alternatively be disposed in a same component.

The mobile communications module 191 may provide a solution for wireless communication including 2G/3G/4G/5G and the like to be applied to the electronic device. The mobile communications module 191 may include a filter, a switch, a power amplifier, a low noise amplifier (low noise amplifier, LNA), and the like.

The wireless communications module 192 may provide a solution for wireless communication including a WLAN (for example, a Wi-Fi network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, and the like to be applied to the electronic device. The wireless communications module 192 may be one or more components integrating at least one communication processing module.

In some embodiments, an antenna 1 of the electronic device is coupled to the mobile communications module 191, and an antenna 2 is coupled to the wireless communications module 192, so that the electronic device may communicate with another device. Specifically, the mobile communications module 191 may communicate with another device by using the antenna 1, and the wireless communications module 192 may communicate with another device by using the antenna 2.

Figure 4:
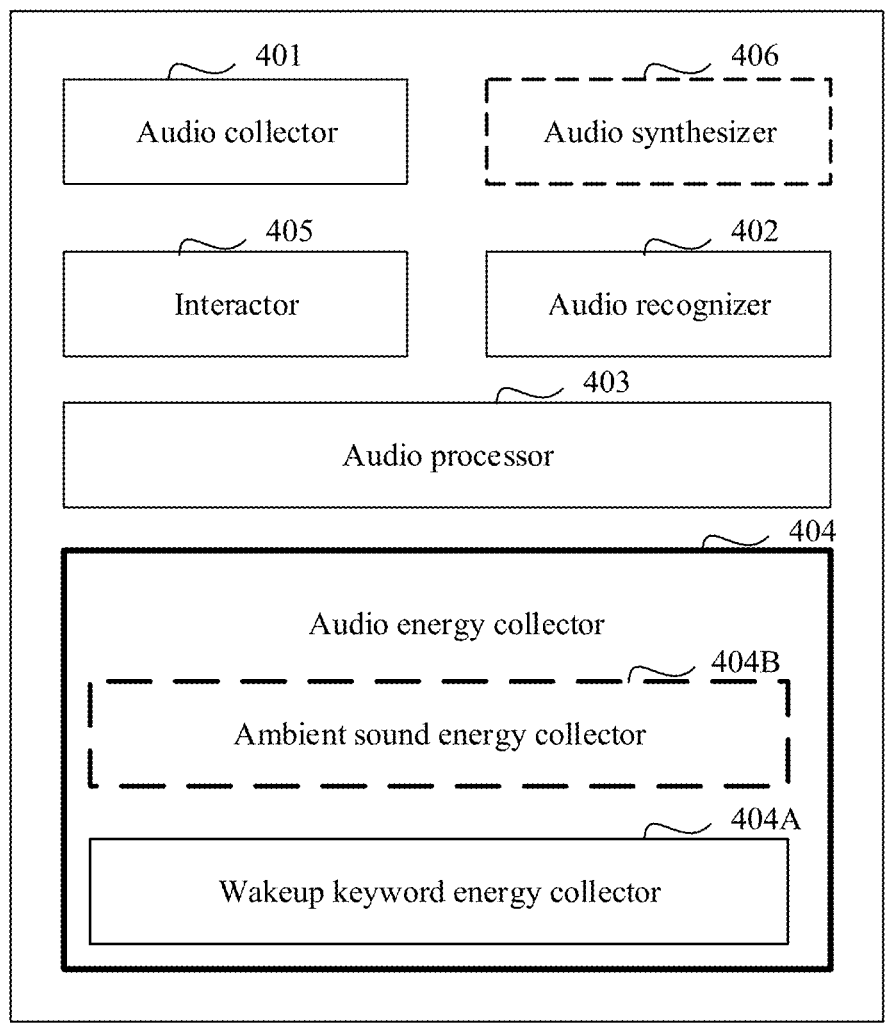
FIG. 4 is a schematic diagram of a structure of software of an electronic device according to an embodiment of this application.

For example, FIG. 4 is a schematic architectural diagram of software of an electronic device according to an embodiment of this application. Specifically, as shown in the figure, the electronic device includes an audio collector (audio collector) 401, an interactor (interactor) 405, an audio recognizer (audio recognizer) 402, an audio processor (audio processor) 403, and an audio energy collector (audio energy collector) 404. The audio collector 401 is configured to store audio data obtained through conversion based on a sound collected by a sound collection device (for example, the microphone 163 shown in FIG. 3, or another sensor for sound collection), and forward the audio data to the audio processor 403. For example, the audio collector 401 may be configured to store audio data obtained from the audio module 160 into a memory (for example, the internal memory 121 or a memory in the processor 110), and forward the audio data stored in the memory to the audio processor 403 for processing. It should be noted that, in this embodiment of this application, the audio collector 401 may actively obtain the audio data from the audio module 160 after receiving a notification that the audio data is obtained by the audio module 160, or the audio module 160 may send the audio data to the audio collector 401 after obtaining the audio data. A manner in which the audio collector 401 obtains the audio data from the audio module 160 is not limited in this embodiment of this application. The audio processor 403 is configured to perform preprocessing, for example, sound channel conversion, smoothing processing, and noise reduction processing, on the audio data, and send preprocessed audio data to the audio recognizer 402, so that the audio recognizer 402 subsequently performs wakeup keyword detection. The audio recognizer 402 is configured to perform wakeup keyword detection on the audio data, and when a wakeup keyword is detected, send audio data in a time period in which the wakeup keyword is located to the audio energy collector 404. For example, the audio recognizer 402 may perform wakeup keyword detection based on audio data at Q sampling moments in a first time period. The first time period may also be referred to as a wakeup keyword time window or the like, and is generally set to a duration not less than a duration required for a user to make a sound of the wakeup keyword. A duration of an interval between two adjacent sampling intervals in the Q moment samples is a first sampling interval, that is, the audio processor 403 may send preprocessed audio data to the audio recognizer 402 every first sampling interval, and the audio recognizer 402 performs, every first sampling interval, wakeup keyword detection once based on latest received audio data at Q sampling moments. When the wakeup keyword is detected, the audio recognizer 402 sends the audio data at the Q sampling moments in the first time period to the audio energy collector 404. It should be noted that, in this embodiment of this application, a value of the first sampling interval may be 0.1 ms, 0.2 ms, or the like, or may be preset, or may be determined based on a preset algorithm. This is not limited. In some other embodiments, the audio recognizer 402 may further perform speech data recognition on the audio data, recognize semantics in speech data, and the like. The audio energy collector 404 is configured to determine wakeup keyword energy information based on the audio data in the time period in which the wakeup keyword is located, and then send the wakeup keyword energy information to the interactor 405. The wakeup keyword energy information is used to indicate a magnitude of audio data received energy in the time period in which the wakeup keyword is located. For example, when the audio recognizer 402 detects the wakeup keyword based on the audio data at the Q sampling moments in the first time period, the magnitude of the audio data received energy in the time period in which the wakeup keyword is located may be an average value of audio data received energy at the Q sampling moments in the first time period. The interactor 405 is configured to exchange information with another device. The interactor 405 is configured to: after receiving the wakeup keyword energy information determined by the audio energy collector 404, send the wakeup keyword energy information to a third-party device, so that the third-party device determines, based on the wakeup keyword energy information, whether to wake up a corresponding electronic device. For example, the interactor 405 is configured to: after receiving the wakeup keyword energy information determined by the audio energy collector 404, send the wakeup keyword energy information to the third-party device by using the mobile communications module 191 and/or the wireless communications module 192.

In some embodiments, the audio energy collector 404 includes a wakeup keyword energy collector 404A and an ambient sound energy collector 404B. The wakeup keyword energy collector 404A is configured to determine the wakeup keyword energy information based on the audio data received in the time period in which the wakeup keyword is located. The ambient sound energy collector 404B is configured to determine ambient sound energy information based on magnitudes of audio data received energy at P sampling moments in a second time period. The ambient sound energy collector 404B stores the magnitudes of the audio data received energy at the P sampling moments in the second time period. A duration of an interval between two adjacent sampling moments in the P sampling moments is a second sampling interval. A value of the second sampling interval may be preset, or may be determined based on a preset algorithm. For example, the second sampling interval may be 1 ms, 2 ms, or 5 ms. For example, values of the second sampling interval in different scenarios may be different. It should be noted that, in this embodiment of this application, the audio data of the ambient sound energy collector 404 is preprocessed audio data sent by the audio processor 403 every second sampling interval. That is, the audio sound energy collector 404 updates the magnitudes of the audio data received energy at the P sampling moments in the second time period once every second sampling interval, that is, updates the ambient sound energy information once every second sampling interval. The ambient sound energy information is used to indicate a magnitude of audio data received energy in the second time period. It should be noted that, the second time period may also be referred to as an ambient sound time window, an ambient sound sampling time window, an ambient sound collection time window, or the like, and is generally set to a duration not less than a duration required for a user to make a sound of the wakeup keyword. For example, a duration of the second time period is greater than a duration of the first time period. In other words, a duration of the ambient sound time window is greater than a duration of the wakeup keyword time window. For example, the second time period may be preset, or may be determined based on a preset algorithm. For example, the second time period may be 5 seconds, 2 seconds, or 1 second. This is not limited. For example, the ambient energy collector 404B stores only the magnitudes of the audio data received energy at the P sampling moments in the second time period. When sending the wakeup keyword energy information to the interactor 405, the wakeup keyword energy collector 404A indicates the ambient sound energy collector 404B to send latest determined ambient sound energy information to the interactor 405. In this case, the interactor 405 is further configured to send the ambient sound energy information to the third-party device. This helps improve accuracy of determining, by the third-party device, whether to wake up an electronic device.

For example, during specific implementation, the ambient sound energy information may be an ambient sound energy value, or may be information used to indicate the ambient sound energy value. The ambient sound energy value is a magnitude of audio data received energy in an ambient sound time window. For example, the ambient sound energy information is an index of the ambient sound energy value. The index of the ambient sound energy value and the ambient sound energy value may satisfy an algorithm.

Figure 5A:
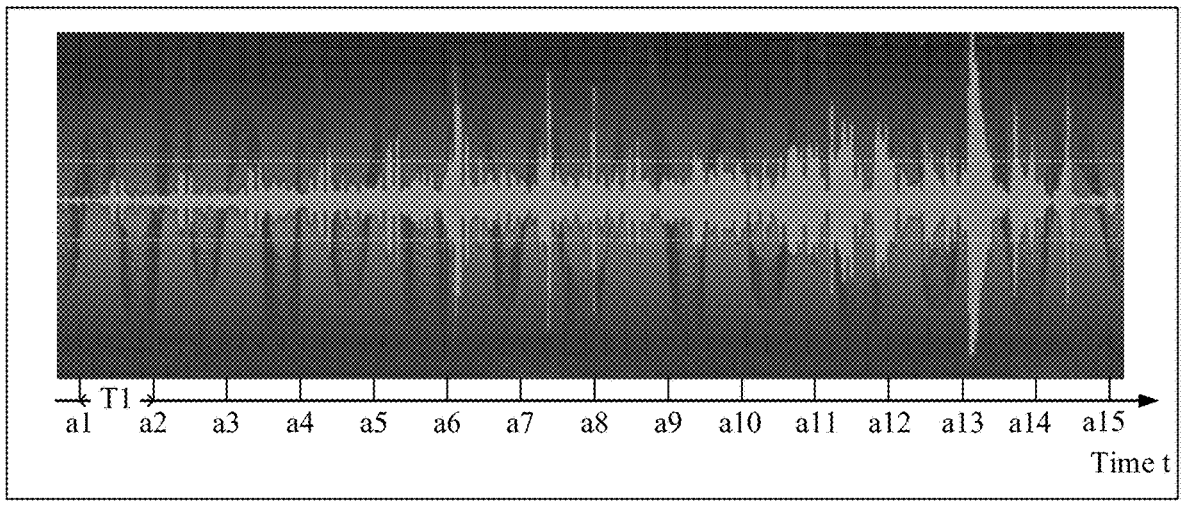
FIG. 5A is a schematic diagram of sampling audio data according to an embodiment of this application.
Figure 5B:
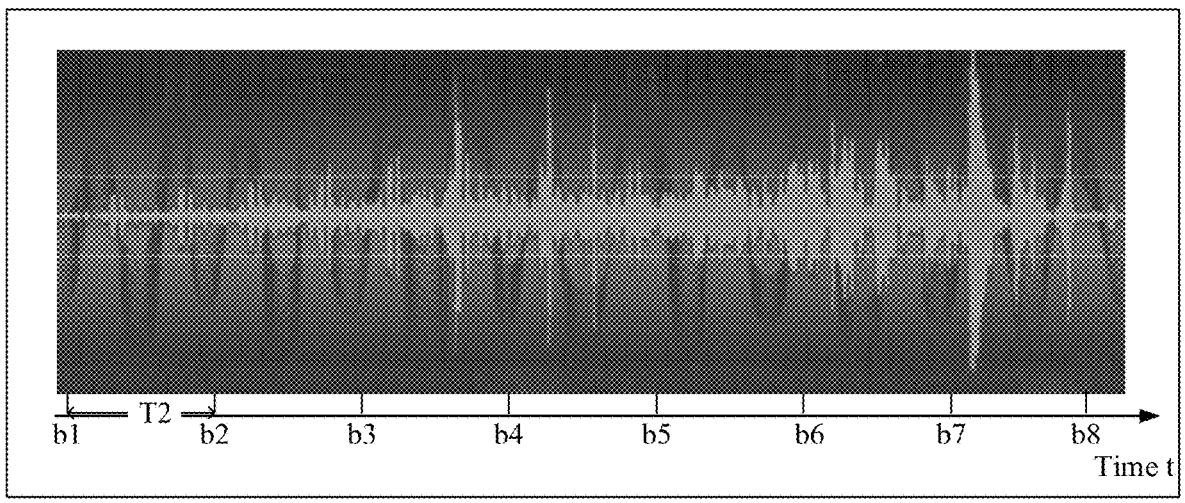
FIG. 5B is another schematic diagram of sampling audio data according to an embodiment of this application.

It should be noted that, in this embodiment of this application, the first sampling interval and the second sampling interval may be the same or different. In some embodiments, the first sampling interval may be less than the second sampling interval. For example, the second sampling interval is 20 times the first sampling interval. This helps improve accuracy of waking up an electronic device nearby in a multi-device scenario. For example, the first sampling interval is T1, the second sampling interval is T2, the ambient sound time window includes audio data at six sampling moments, and the wakeup keyword time window includes audio data at seven sampling moments. For example, when audio data at seven sampling moments in a current wakeup keyword time window is respectively audio data at moments a7, a8, a9, a10, a11, a12, and a13 shown in FIG. 5A, after the audio recognizer 402 obtains audio data at a moment a14 from the audio processor 403, if the audio data at the seven sampling moments in the wakeup keyword time window is updated to audio data at the moments a8, a9, a10, a11, a12, a13, and a14 and wakeup keyword detection is performed based on the audio data at the moments a8, a9, a10, a11, a12, a13, and a14, when the audio recognizer 402 detects a wakeup keyword during the wakeup keyword detection based on the audio data at the moments a8, a9, a10, a11, a12, a13, and a14, the audio data at the moments a8, a9, a10, a11, a12, a13, and a14 is sent to the wakeup keyword energy collector 404A, to determine wakeup keyword energy information. If audio data at six sampling moments included in an ambient sound time window when the audio recognizer 402 detects the wakeup keyword is audio data at moments b2 to b7 shown in FIG. 5B, ambient sound energy information is determined based on magnitudes of audio data received energy at the moments b2 to b7. It should be understood that the foregoing description is merely an example, and does not constitute a limitation on this application. FIG. 5B is used as an example. It may be understood that if the audio data included in the ambient sound time window is the audio data at the moments b2 to b7, when a sampling moment b8 arrives, the audio data included in the ambient sound time window is updated to audio data at the moments b3 to b8.

In addition, in some embodiments, the electronic device may further include an audio synthesizer (audio synthesizer) 406. The audio synthesizer 406 is configured to synthesize corresponding audio data, and convert the audio data into a sound for playing. For example, the electronic device may play, in response to a collected sound of speaking "Xiaoyi Xiaoyi" by the user, a sound of "Can I help you" by using the speaker 161. In this case, the audio synthesizer is configured to: in response to the collected sound of speaking "Xiaoyi Xiaoyi" by the user, synthesize corresponding audio data, convert synthesized audio data into the sound of "Can I help you", and play the sound.

It should be understood that the software structure shown in FIG. 4 is merely an example. The electronic device in this embodiment of this application may have more or fewer modules than the electronic device shown in the figure, may combine two or more modules, or the like. The modules shown in the figure may be implemented in hardware, software, or a combination of hardware and software, including one or more signal processors and/or application specific integrated circuits.

It should be noted that the audio collector 401, the interactor 405, the audio recognizer 402, the audio processor 403, and the audio energy collector 404 shown in FIG. 4 may be integrated into one or more processing units in the processor 110 shown in FIG. 3. For example, some or all of the audio collector 401, the interactor 405, the audio recognizer 402, the audio processor 403, and the audio energy collector 404 may be integrated into one or more processors, such as an application processor or a dedicated processor. It should be noted that the dedicated processor in this embodiment of this application may be a DSP, an application-specific integrated circuit (application-specific integrated circuit, ASIC) chip, or the like.

The following embodiments may all be implemented in an electronic device having the foregoing hardware structure and/or software structure.

In some embodiments, the electronic device may perform the voice wakeup method in the embodiments of this application when the voice wakeup function is enabled. This helps improve interaction between a user and the electronic device. For example, the electronic device may enable the voice wakeup function in response to an operation performed by the user on a virtual button that is in a user interface and that is configured to control the voice wakeup function. For another example, the electronic device may alternatively enable the voice wakeup function in response to a quick gesture operation (for example, a slide operation of a knuckle on the display 132, or a three-finger slide-down operation) or other operations in a screen-off, screen-locked, or screen-on state.

Figure 6:
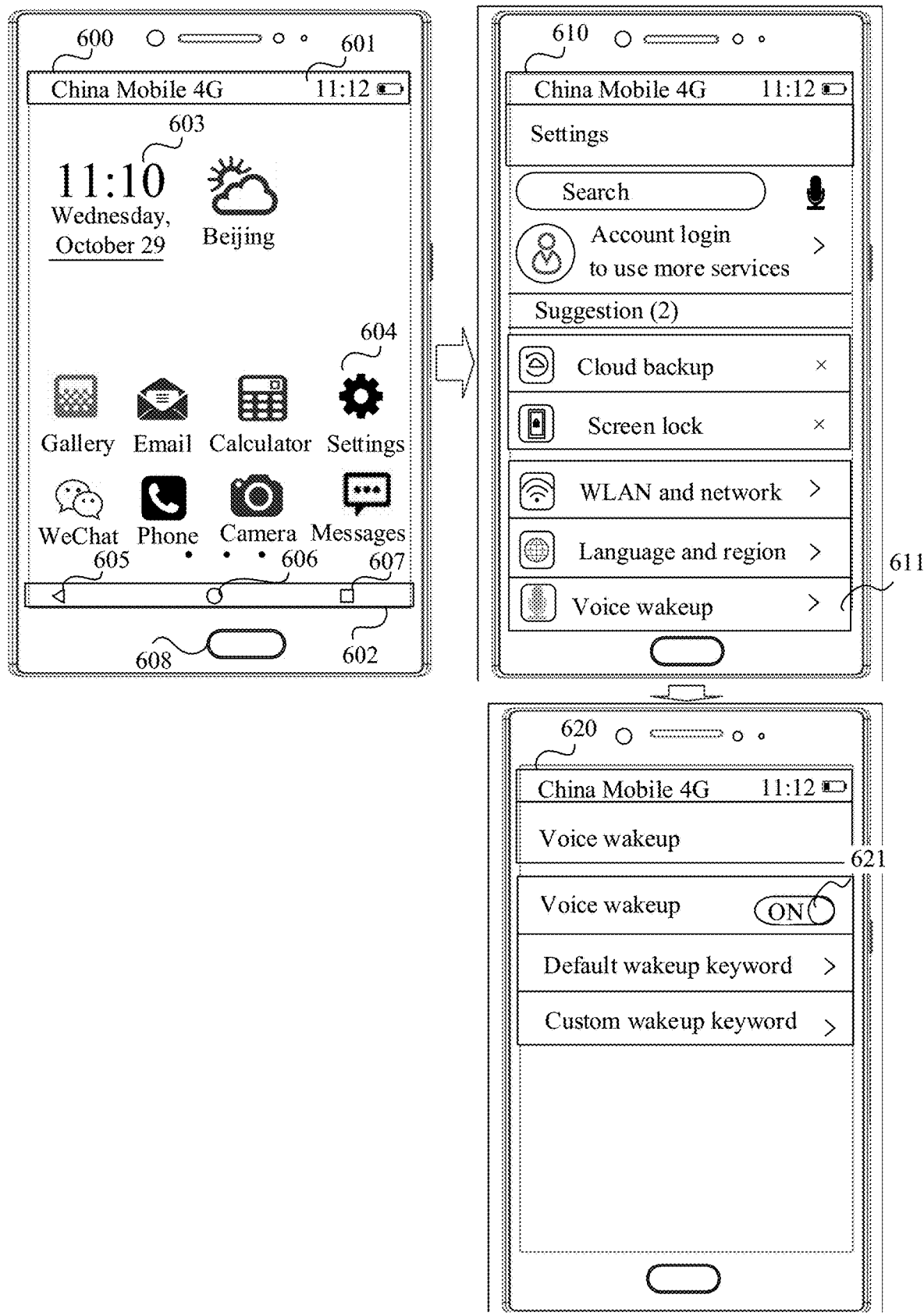
FIG. 6 is a schematic diagram of a user interface according to an embodiment of this application.

For example, a home screen displayed by the electronic device on the display 132 may be a user interface 600 shown in FIG. 6. The user interface 600 may include a status bar 601, a hidden navigation bar 602, a time and weather widget (Widget) 603, and a plurality of application program icons (for example, a settings icon 604). The status bar 601 may include an operator name (China Mobile), a mobile network identifier (for example, 4G), time, and remaining battery power. The navigation bar 602 may include a back button (back button) 605, a home button (home button) 606, and a menu button (menu button) 607. It may be understood that, in some other embodiments, the status bar 601 may further include a Bluetooth icon, a Wi-Fi icon, an external device icon, and the like. It may be further understood that in some other embodiments, the user interface 600 may further include a shortcut bar. The shortcut bar may also be referred to as a dock bar, a common application bar, or the like. The shortcut bar may include icons of commonly used application programs, and the like. After detecting a touch operation performed by a finger (or a stylus or the like) of a user on an icon of an application program, the electronic device starts the application program in response to the touch operation, and displays a user interface of the application program on the display 132. For example, if the electronic device detects a touch operation on the settings icon 604, the electronic device displays a system setting interface on the display 132 in response to the touch operation. For example, the system setting interface may be a user interface 610 shown in FIG. 6. The user interface 610 includes a voice wakeup option 601. In some other embodiments, the user interface 610 may further include a plurality of setting options for other functions, such as account login, cloud backup, and screen lock. The electronic device displays a user interface 620 on the display 132 in response to an operation of the user on the voice wakeup option 601. The user interface 620 may also be referred to as a voice wakeup setting interface, and may include a virtual button 621. The virtual button 621 is configured to control the voice wakeup function to be enabled (ON) or disabled (OFF). For example, the electronic device enables the voice wakeup function in response to that the user sets the virtual button 621 to ON. For another example, the electronic device disables the voice wakeup function in response to that the user sets the virtual button 621 to OFF.

In some other embodiments, the electronic device may further include a home screen key 608, as shown in FIG. 6. The home screen key 608 may be a physical key, or may be a virtual key. The home screen key 608 is configured to resume a user interface displayed on the display 132 to the home screen based on an operation of the user, so that the user can conveniently view the home screen at any time and perform an operation on a control (for example, an icon) in the home screen. The operation may be specifically performed by the user by pressing the home screen key 608. In some other embodiments of this application, the home screen key 608 may further integrate a fingerprint sensor. In this way, when the user presses the home screen key 608, the electronic device may perform fingerprint collection, to determine a user identity. In some other embodiments, the electronic device may alternatively not include the home screen key 608.

The multi-device scenario shown in FIG. 1 is used as an example to describe the voice wakeup method in the embodiments of this application.

Figure 7:
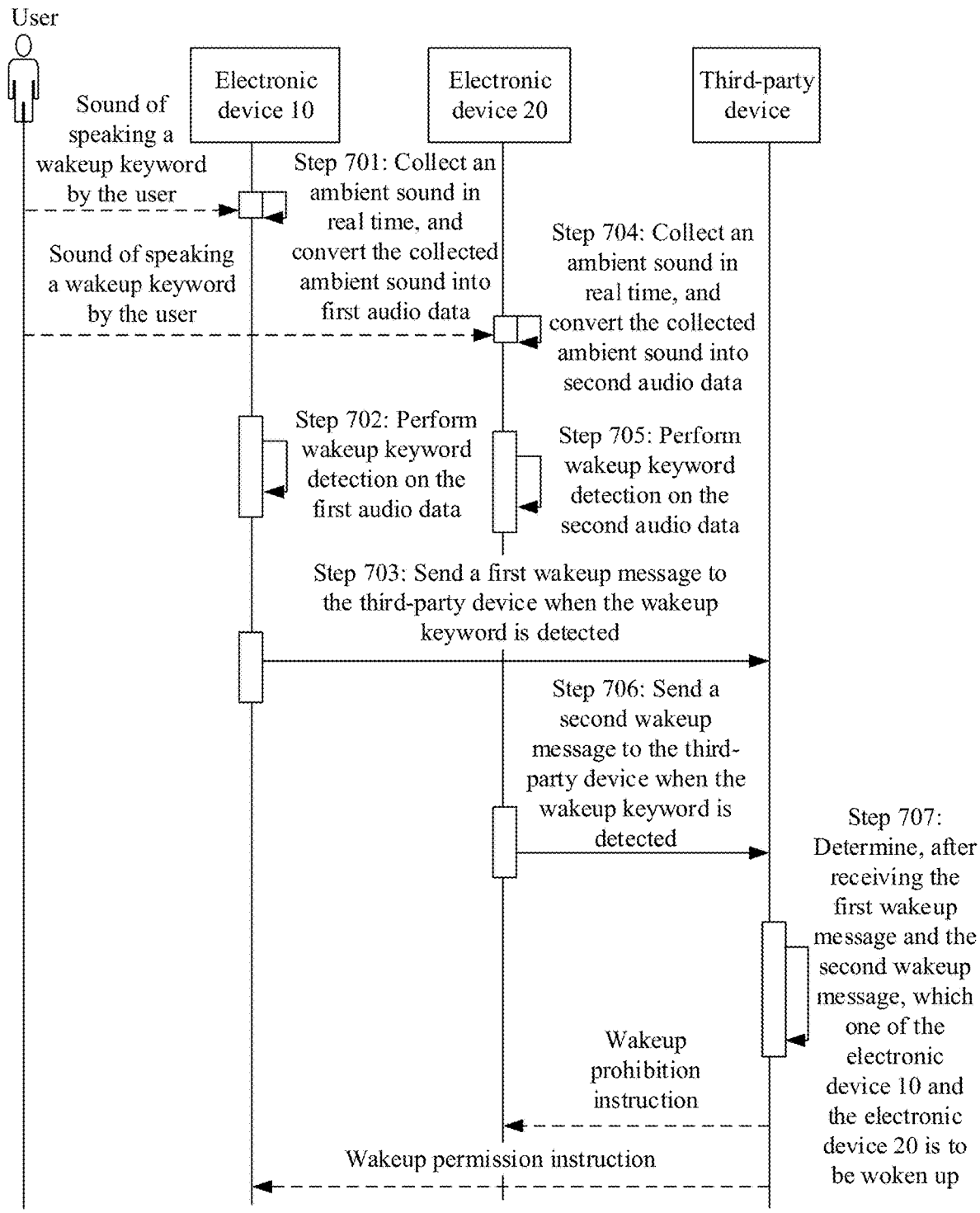
FIG. 7 is a schematic flowchart of a voice wakeup method according to an embodiment of this application.

For example, FIG. 7 shows a voice wakeup method according to an embodiment of this application. The method specifically includes the following steps.

Step 701: The electronic device 10 collects an ambient sound in real time, and converts the collected ambient sound into first audio data.

For example, the electronic device 10 may collect an ambient sound by using a sound collection device (for example, a microphone or another sensor for sound collection). After collecting the ambient sound, the sound collection device converts the ambient sound into audio electrical data, and outputs the audio electrical data to the audio module 160, so that the audio module 160 performs encoding and/or analog-to-digital conversion to obtain audio data in a corresponding format. After obtaining the audio data in the corresponding format, the audio module 160 may send the audio data in the corresponding format to the audio collector 401 in the processor 110. The audio collector 401 stores the audio data in the corresponding format into a memory (for example, the internal memory 121 and/or another memory) and sends the audio data in the corresponding format to the audio processor 403, so that the audio processor 403 preprocesses the audio data in the corresponding format to obtain first audio data. In some other embodiments, after obtaining the audio data in the corresponding format, the audio module 160 may alternatively send a notification that the audio data in the corresponding format is obtained to the audio collector 401 in the processor 110. After receiving the notification sent by the audio module 160, the audio collector 401 obtains the audio data in the corresponding format from the audio module 160, and then stores the audio data in the corresponding format into the memory, and sends the audio data in the corresponding format to the audio processor 403, so that the audio processor 403 preprocesses the audio data in the corresponding format to obtain first audio data.

Step 702: The electronic device 10 performs wakeup keyword detection based on the first audio data.

For example, the electronic device 10 performs wakeup keyword detection on the first audio data by using the processor 110. For example, the electronic device 10 performs wakeup keyword detection on the first audio data by using the audio recognizer 402 in the processor 110. The first audio data in the audio recognizer 402 is obtained from the audio processor. In some embodiments, after obtaining the first audio data, the audio processor 403 may send the first audio data to the audio recognizer 402 for wakeup keyword detection. For example, the audio processor 403 sends obtained first audio data to the audio recognizer 402 every first sampling interval. It should be noted that, for a manner in which the audio recognizer 402 performs wakeup keyword detection based on the first audio data, refer to related descriptions in describing the software structure of the electronic device shown in FIG. 4. Details are not described herein again.

In some other embodiments, the electronic device 10 may further determine first ambient sound energy information based on the first audio data. The first ambient sound energy information is used to indicate a first ambient sound energy value, and the first ambient sound energy value is a magnitude of audio data received energy of the electronic device 10 in an ambient sound time window. For example, the electronic device 10 determines the first ambient sound energy information based on the first audio data by using the processor 110. For example, after obtaining the first audio data, the audio processor 403 in the processor 110 may send the first audio data to the ambient sound energy collector 404B in the audio energy collector 404. For example, the audio processor 403 sends obtained first audio data to the ambient sound energy collector 404B every second sampling interval. The ambient sound energy collector 404B determines the first ambient sound energy information based on the first audio data. It should be noted that, for a manner in which the ambient sound energy collector 404B determines the first ambient sound energy information, refer to related descriptions in describing the software structure of the electronic device shown in FIG. 4. Details are not described herein again.

Step 703: The electronic device 10 sends a first wakeup message to a third-party device when a wakeup keyword is detected, where the first wakeup message includes first wakeup keyword energy information and the first ambient sound energy information. The first wakeup keyword energy information is used to indicate a first wakeup keyword energy value, and the first wakeup keyword energy value is a magnitude of audio data received energy of the electronic device 10 in a time period (a wakeup keyword time window) in which the wakeup keyword is located. The first ambient sound energy information is used to indicate the first ambient sound energy value, and the first ambient sound energy value is the magnitude of the audio data received energy of the electronic device 10 in the ambient sound time window. It may be understood that a last sampling moment in the ambient sound time window corresponding to the first ambient sound energy information is earlier than or equal to a last sampling moment in the wakeup keyword time window, and a time difference between the last sampling moment in the ambient sound time window and the last sampling moment in the wakeup keyword time window is less than a time difference between a sampling moment in the ambient sound time window other than the last sampling moment and the last sampling moment in the wakeup keyword time window. That is, when the electronic device 10 detects the wakeup keyword and sends the wakeup message to the third-party device, the ambient sound energy information included in the wakeup message is latest ambient sound energy information calculated when the wakeup keyword is detected.

It should be noted that, in this embodiment of this application, ambient sound time windows of different electronic devices may be the same or different, and wakeup keyword time windows of different electronic devices may be the same or different. This is not limited.

In some embodiments, when the processor 110 detects the wakeup keyword, the electronic device 10 sends the first wakeup message to the third-party device by using the mobile communications module 191 and/or the wireless communications module 192. For example, when the audio recognizer 402 in the processor 110 detects the wakeup keyword, the electronic device 10 sends, to the wakeup keyword energy collector 404A, audio data in the time period in which the wakeup keyword is located. The wakeup keyword energy collector determines the first wakeup keyword energy information based on the audio data in the time period in which the wakeup keyword is located, sends the first wakeup keyword energy information to the interactor 405, and indicates the ambient sound energy collector 404B to send the first ambient sound energy information to the interactor. Then the interactor 405 obtains the first wakeup message based on the first wakeup keyword energy information and the first ambient sound energy information, and sends the first wakeup message to the third-party device by using the mobile communications module 191 and/or the wireless communications module 192.

In some embodiments, when the wakeup keyword is detected, the electronic device 10 may determine the first wakeup keyword energy value based on magnitudes of audio data received energy at Q sampling moments in the wakeup keyword time window. For example, the first wakeup keyword energy value is an average value of the audio data received energy at the Q sampling moments in the wakeup keyword time window of the electronic device 10. For example, the first wakeup keyword energy value may satisfy the following expression:

$$E_{wakeup} = \frac{1}{Q}\sum_{j=1}^{Q} E_j,$$

where $E_{wakeup}$ is the first wakeup keyword energy value, Q is a quantity of sampling moments in the wakeup keyword time window, and $E_j$ is a magnitude of audio data received energy at a $j^{th}$ sampling moment in the wakeup keyword time window. It should be noted that the foregoing description is merely an example of determining the first wakeup keyword energy value based on the audio data received energy at the Q sampling moments in the wakeup keyword time window. In this embodiment of this application, the average value of the audio data received energy at the Q sampling moments in the wakeup keyword time window may alternatively be determined by using another algorithm, to obtain the first wakeup keyword energy value. For example, the first wakeup keyword energy value may be a geometric average value, a square average value, a weighted average value, or the like of the audio data received energy at the Q sampling moments.

In some embodiments, the electronic device 10 may determine the first ambient sound energy value every second sampling interval based on audio data received energy at P sampling moments in the ambient sound time window. For example, the first ambient sound energy value is determined by the electronic device 10 based on magnitudes of the audio data received energy at the P sampling moments in the ambient sound time window. For example, the first ambient sound energy value may satisfy the following expression:

$$E_{ambient} = \frac{1}{P}\sum_{i=1}^{P} E_i,$$

where $E_{ambient}$ is the first ambient sound energy value, P is a quantity of sampling moments in the ambient sound time window, and $E_i$ is a magnitude of audio data received energy at an $i^{th}$ sampling moment in the sampling period.

It should be noted that the foregoing description is merely an example of determining the first ambient sound energy value based on the audio data received energy at the P sampling moments in the ambient sound time window. In this embodiment of this application, the average value of the audio data received energy at the P sampling moments in the ambient sound time window may alternatively be determined by using another algorithm, to obtain the first ambient sound energy value. For example, the first ambient sound energy value may be a geometric average value, a square average value, a weighted average value, or the like of the audio data received energy at the P sampling moments.

It may be understood that, in this embodiment of this application, the first wakeup message may also be referred to as a first wakeup request. This is not limited.

Step 704: The electronic device 20 collects an ambient sound in real time, and converts the collected ambient sound into second audio data.

Step 705: The electronic device 20 performs wakeup keyword detection on the second audio data.

Step 706: The electronic device 20 sends a second wakeup message to the third-party device when a wakeup keyword is detected, where the second wakeup message includes second wakeup keyword energy information and second ambient sound energy information. The second wakeup keyword energy information is used to indicate a second wakeup keyword energy value, and the second wakeup keyword energy value is a magnitude of audio data received energy of the electronic device 20 in a time period in which the wakeup keyword is located. The second ambient sound energy information is used to indicate a second ambient sound energy value, and the second ambient sound energy value is a magnitude of audio data received energy in an ambient sound time window of the electronic device 20.

It should be noted that for specific implementations of step 704, step 705, and step 706, refer to related descriptions in step 701, step 702, and step 703. Details are not described herein again.

It should be further noted that there is no necessary sequence between steps 701, 702, and 703 and steps 704, 705, and 706. For example, step 704 may be performed before step 701, or may be performed after step 701 and before step 702. Alternatively, step 704 and step 701 may be performed at the same time.

Step 707: After receiving the first wakeup message sent by the electronic device 10 and the second wakeup message sent by the electronic device 20, the third-party device determines, based on the first ambient sound energy information, the first wakeup keyword energy information, the second ambient sound energy information, and the second wakeup keyword energy information, which one of the electronic device 10 and the electronic device 20 is to be woken up.

For example, based on a preset algorithm, the third-party device determines, based on the first ambient sound energy information, the first wakeup keyword energy information, the second ambient sound energy information, and the second wakeup keyword energy information, which one of the electronic device 10 and the electronic device 20 is to be woken up.

It should be noted that, the preset algorithm may include one or more algorithms. For example, the preset algorithm includes one or more wakeup keyword energy value normalization algorithms used to normalize a wakeup keyword energy value.

In some embodiments, the preset algorithm includes one algorithm, for example, a first wakeup keyword energy value normalization algorithm. The first wakeup keyword energy value normalization algorithm satisfies an expression (1):

$$E_{normalize}=E_{wakeup}\pm\lambda\times E_{ambient} \quad (1), \text{where}$$

$E_{normalize}$ is a normalized wakeup keyword energy value, $E_{wakeup}$ is a wakeup keyword energy value, $E_{ambient}$ is an ambient sound energy value, and $\lambda$ is an ambient impact factor of an electronic device.

The first wakeup keyword energy value normalization algorithm helps reduce impact of ambient noise on voice wakeup of the electronic device, and helps improve reliability of waking up an electronic device nearby in a multi-device scenario.

It should be noted that the ambient impact factor $\lambda$ is used to indicate a degree of impact of audio data received energy of the electronic device for an ambient sound on audio data received energy of a sound of speaking a wakeup keyword by a user. Ambient impact factors of different electronic devices may be different or may be the same, and are related to a magnitude of the ambient sound and a magnitude of the sound of speaking the wakeup keyword by the user. For example, the ambient impact factor may be determined based on a preset algorithm, or may be preconfigured. An ambient impact factor $\lambda_1$ of the electronic device 10 is used as an example. Xi may be determined based on the first wakeup keyword energy value $E_{wakeup1}$ and the first ambient sound energy value $E_{ambient1}$. For example, $\lambda_1$ is $\lambda$ corresponding to a ratio range to which a ratio of $E_{wakeup1}$ to $E_{ambient1}$ belongs. $\lambda$ corresponding to different ratio ranges may be preconfigured in the third-party device, and then the third-party device may determine ambient impact factors of different electronic devices with reference to an actual situation. For another example, if the ambient energy factor is preconfigured in the electronic device, the electronic device may add the ambient impact factor to a wakeup message when sending the wakeup message to the third-party device. For example, the ambient energy factor $\lambda_1$ of the electronic device 10 may be sent to the third-party device by using the first wakeup message. For another example, when sending a first wakeup message to the third-party device for the first time, the electronic device 10 may add the ambient impact factor $\lambda_1$ to the first wakeup message. When the electronic device 10 subsequently sends a first wakeup message to the third-party device, the electronic device may not write the ambient impact factor $\lambda_1$ to the first wakeup message.

When determining, based on the first wakeup keyword energy value normalization algorithm, which one of the electronic device 10 and the electronic device 20 is to be woken up, the third-party device may compare a normalized first wakeup keyword energy value $E_{normalize1}$ with a normalized second wakeup keyword energy value $E_{normalize2}$. If $E_{normalize1}>E_{normalize2}$, the third-party device sends a wakeup permission instruction to the electronic device 10, and sends a wakeup prohibition instruction to the electronic device 20. The electronic device 10 receives the wakeup permission instruction, and wakes up in response to that a sound of speaking the wakeup keyword by the user is detected. In response to that the wakeup prohibition instruction is received, the electronic device 20 does not perform an operation in response to that a sound of speaking the wakeup keyword by the user is detected.

$E_{normalize1} = E_{wakeup1} \pm \lambda_1 \times E_{ambient1}$ and $E_{normalize2} = E_{wakeup2} \pm \lambda_2 \times E_{ambient2}$. $E_{normalize1}$ is the normalized first wakeup keyword energy value, $E_{wakeup1}$ is the first wakeup keyword energy value, $E_{ambient1}$ is the first ambient sound energy value, and $\lambda_1$ is the ambient impact factor of the electronic device 10. $E_{normalize2}$ is the normalized second wakeup keyword energy value, $E_{wakeup2}$ is the second wakeup keyword energy value, $E_{ambient2}$ is the second ambient sound energy value, and $\lambda_2$ is an ambient impact factor of the electronic device 20.

In some other embodiments, the preset algorithm includes one algorithm, for example, a second wakeup keyword energy value normalization algorithm. The second wakeup keyword energy value normalization algorithm satisfies an expression (2):

$$E_{normalize} = \theta \times (E_{wakeup} \pm \lambda \times E_{ambient}) \qquad (2), \text{where}$$

$E_{normalize}$ is a normalized wakeup keyword energy value, and $\theta$ is a device compensation factor of an electronic device, and is used to indicate a sound collection capability of the electronic device. $E_{wakeup}$ is a wakeup keyword energy value, $E_{ambient}$ is an ambient sound energy value, and $\lambda$ is an ambient impact factor of the electronic device. For a configuration manner of $\lambda$, refer to related descriptions of the configuration manner of $\lambda$ in the expression (1). Details are not described herein again.

The second wakeup keyword energy value normalization algorithm helps reduce, during voice wakeup of an electronic device, impact of ambient noise and a sound collection capability of the device, and helps further improve reliability of waking up an electronic device in a multi-device scenario.

It should be noted that device compensation factors of different electronic devices may be different or may be the same. The device compensation factor may be preconfigured. Generally, as an electronic device is used, a sound collection capability of the device changes. Therefore, in some embodiments, an initial value of the device compensation factor may be preconfigured, and then the device compensation factor is updated based on a preset algorithm every preset duration (for example, one quarter, one month, or half a year). This helps improve accuracy of the sound collection capability, indicated by the device compensation factor, of the device. It should be noted that in this embodiment of this application, the device compensation factor is further related to the sound collection capability of the electronic device. The sound collection capability of the electronic device is related to a sound collection device (for example, a microphone or a sound collection sensor). For example, generally, a larger quantity of microphones on the electronic device indicates a stronger sound collection capability of the electronic device. For example, in this embodiment of this application, for electronic devices of a same batch and a same model, initial values of preset device compensation factors may be the same.

In some embodiments, when initial values of device compensation factors preconfigured for electronic devices of a same batch and a same model are the same, an initial value of a device compensation factor that corresponds to a delivery time and a model of an electronic device may be preset in the third-party device. Then each time the electronic device reports a wakeup message to the third-party device, the wakeup message may include delivery time information and model information of the electronic device. The third-party device determines, based on the delivery time information and the model information of the electronic device, the initial value of the device compensation factor that corresponds to the delivery time and the model of the electronic device, and then determines, based on a time at which the wakeup message is sent and the delivery time, whether the device compensation factor needs to be revised. For example, if a duration between the time at which the wakeup message is sent and the delivery time is greater than or equal to Y times of a preset duration, the initial value of the device compensation factor is revised based on a revision coefficient T corresponding to the Y times of the preset duration. Y may be a positive integer greater than or equal to 1. For example, in this embodiment of this application, the initial value of the device compensation factor may be revised based on the following expression:

$\theta_{rev} = \mu_T \times \theta_{initial}$, where $\theta_{rev}$ is a revised device compensation factor of the electronic device, T is the revision coefficient corresponding to the Y times of the preset duration, and $\theta_{initial}$ is the initial value of the device compensation factor of the electronic device.

It should be noted that, revision coefficients corresponding to different multiples of the preset duration are different, and may be preconfigured in the third-party device as required. In addition, it should be further noted that, for electronic devices of different batches and/or different models, preset durations for updating device compensation factors may be different, and revision coefficients corresponding to a same multiple of preset durations may also be different. In this embodiment of this application, the device compensation factor may alternatively be revised in another manner.

The electronic device 10 is used as an example. For example, the electronic device 10 adds delivery time information and model information of the electronic device 10 to the first wakeup message. The third-party device determines, based on the delivery time information and the model information of the electronic device 10, an initial value $\theta_{initial1}$ of a device compensation factor corresponding to the electronic device 10, and then determines, based on a time at which the first wakeup message is sent and a delivery time of the electronic device 10, whether the device compensation factor needs to be revised. For example, if a duration between the time at which the first wakeup message is sent and the delivery time of the electronic device 10 is greater than or equal to 1 time of a preset duration, the initial value $\theta_{initial1}$ of the device compensation factor is revised based on a revision coefficient $\mu_{T1}$ corresponding to the 1 time of the preset duration, to obtain $\theta_{rev1}$. For another example, the electronic device 10 may alternatively add device use duration information and the model information of the electronic device 10 to the first wakeup message. The third-party device determines the delivery time information based on the use duration information of the electronic device 10, then determines, based on the delivery time information and the model information, the initial value $\theta_{initial1}$ of the device compensation factor corresponding to the electronic device 10, and then determines, based on the time at which the first wakeup message is sent and the delivery time of the electronic device 10, whether the device compensation factor needs to be revised.

It should be noted that, in this embodiment of this application, when a device use duration reaches a threshold, the electronic device may add the delivery time information and the model information of the electronic device 10, or the device use duration information and the model information of the electronic device 10 to the first wakeup message. Alternatively, each time the electronic device 10 sends a first wakeup message to the third-party device, the first wakeup message carries the delivery time information and/or the device use duration information, the model information, and the like. A manner in which the first wakeup message is triggered to carry the delivery time information and/or the device use duration information, and the model information is not limited in this embodiment of this application.

In some other embodiments, alternatively, the delivery time of the electronic device may be not considered in this embodiment of this application, and initial values of device compensation factors preconfigured for electronic devices of a same model are the same. In this case, an initial value of a device compensation factor corresponding to a model of an electronic device may be preset in the third-party device. Then each time the electronic device reports a wakeup message to the third-party device, the wakeup message may include model information of the electronic device and a use duration of the electronic device. The third-party device determines, based on the model information of the electronic device, the initial value of the device compensation factor corresponding to the model of the electronic device, and then may determine, based on the use duration of the electronic device, whether the device compensation factor needs to be revised. For a manner in which the third-party device revises the device compensation factor based on the use duration of the electronic device, refer to the foregoing related descriptions. Details are not described herein again.

For another example, in this application, the initial value of the device compensation factor may alternatively be preconfigured in the electronic device, and then the electronic device revises the device compensation factor based on a preset algorithm. For example, the electronic device may revise the device compensation factor based on a use duration of the device, and revision coefficients corresponding to different use durations may be preset. In this case, after a use duration reaches a threshold, the electronic device may revise the device compensation factor based on a revision coefficient corresponding to the use duration. For a specific algorithm for revising the device compensation factor based on the revision coefficient, refer to the algorithm for revising the device compensation factor by the third-party device. Details are not described herein again. After the electronic device revises the device compensation factor, the electronic device may add the device compensation factor to a wakeup message, so that the third-party device obtains the device compensation factor of the electronic device. The electronic device 10 is used as an example. After the device compensation factor is revised, the electronic device 10 may add the device compensation factor to the first wakeup message, so that the third-party device obtains the device compensation factor of the electronic device 10.

When determining, based on the second wakeup keyword energy value normalization algorithm, which one of the electronic device 10 and the electronic device 20 is to be woken up, the third-party device may compare a normalized first wakeup keyword energy value $E_{normalize1}$ with a normalized second wakeup keyword energy value $E_{normalize2}$. If $E_{normalize1} > E_{normalize2}$, the third-party device sends a wakeup permission instruction to the electronic device 10, and sends a wakeup prohibition instruction to the electronic device 20. The electronic device 10 receives the wakeup permission instruction, and wakes up in response to that a sound of speaking the wakeup keyword by the user is detected. In response to that the wakeup prohibition instruction is received, the electronic device 20 does not perform an operation in response to that a sound of speaking the wakeup keyword by the user is detected.

$E_{normalize1} = \theta_1 \times (E_{wakeup1} \pm \lambda_1 \times E_{ambient1})$ and $E_{normalize2} = \theta_2 \times (E_{wakeup2} \pm \lambda_2 \times E_{ambient2})$. $E_{normalize1}$ is the normalized first wakeup keyword energy value, $E_{wakeup1}$ is the first wakeup keyword energy value, $E_{ambient1}$ is the first ambient sound energy value, $\lambda_1$ is the ambient impact factor of the electronic device 10, and $\theta_1$ is the device compensation factor of the electronic device 10. $E_{normalize2}$ is the normalized second wakeup keyword energy value, $E_{wakeup2}$ is the second wakeup keyword energy value, $E_{ambient2}$ is the second ambient sound energy value, and $\lambda_2$ is the ambient impact factor of the electronic device 20, and $\theta_2$ is a device compensation factor of the electronic device 20.

$\theta_1$ is used as an example. It should be noted that $\theta_1$ may be a value obtained after the electronic device 10 normalizes the initial value of the device compensation factor, or may be the initial value of the device compensation factor. For example, in this embodiment of this application, the third-party device may determine whether to use the initial value of the device compensation factor of the electronic device 10 as $\theta_1$ or use the value obtained after the initial value of the device compensation factor is normalized as $\theta_1$. For another example, in this embodiment of this application, if the electronic device 10 adds the initial value of the device compensation factor to the first wakeup message, $\theta_1$ is the initial value of the device compensation factor. If the electronic device 10 adds the value obtained after the initial value of the device compensation factor is normalized to the first wakeup message, $\theta_1$ is the value obtained after the initial value of the device compensation factor is normalized. For a value of $\theta_2$, refer to the manner of obtaining the value of $\theta_1$. Details are not described herein again.

In some other embodiments, the preset algorithm may further include two or more algorithms. For example, the preset algorithm includes a first wakeup keyword energy value normalization algorithm and a second wakeup keyword energy value normalization algorithm. For the first wakeup keyword energy value normalization algorithm and the second wakeup keyword energy value normalization algorithm, refer to related descriptions in the foregoing embodiments. In this case, after receiving the first wakeup message and the second wakeup message, the third-party device may select one from the first wakeup keyword energy value normalization algorithm and the second wakeup keyword energy value normalization algorithm, and then based on the selected algorithm, determine, based on the first ambient sound energy information, the first wakeup keyword energy information, the second ambient sound energy information, and the second wakeup keyword energy information, which one of the electronic device 10 and the electronic device 20 is to be woken up.

For example, when the device compensation factor of the electronic device 10 is different from the device compensation factor of the electronic device 20, the third-party device may select the second wakeup keyword energy value normalization algorithm from the first wakeup keyword energy value normalization algorithm and the second wakeup keyword energy value normalization algorithm. When the device compensation factor of the electronic device 10 is the same as the device compensation factor of the electronic device 20, the third-party device may select the first wakeup keyword energy value algorithm from the first wakeup keyword energy value normalization algorithm and the second wakeup keyword energy value normalization algorithm. In some other embodiments, when the device compensation factor of the electronic device 10 is the same as the device compensation factor of the electronic device 20, the third-party device may alternatively select the second wakeup keyword energy value algorithm from the first wakeup keyword energy value normalization algorithm and the second wakeup keyword energy value normalization algorithm.

For another example, the preset algorithm may alternatively include three algorithms, for example, a first wakeup keyword energy value normalization algorithm, a second wakeup keyword energy value normalization algorithm, and a third wakeup keyword energy value normalization algorithm. For the first wakeup keyword energy value normalization algorithm and the second wakeup keyword energy value normalization algorithm, refer to the foregoing related descriptions. The third wakeup keyword energy value normalization algorithm may satisfy an expression (3):

$$E_{normalize} = \theta \times E_{wakeup} \qquad (3),$$

where $E_{normalize}$ is a normalized wakeup keyword energy value, $E_{wakeup}$ is a wakeup keyword energy value, and $\theta$ is a device compensation factor of an electronic device. For a related description of the device compensation factor, refer to the foregoing related description of the device compensation factor.

When the preset algorithm includes the first wakeup keyword energy value normalization algorithm, the second wakeup keyword energy value normalization algorithm, and the third wakeup keyword energy value normalization algorithm, after receiving the first wakeup message and the second wakeup message, the third-party device may select one from the first wakeup keyword energy value normalization algorithm, the second wakeup keyword energy value normalization algorithm, and the third wakeup keyword energy value normalization algorithm, and then based on the selected algorithm, determine, based on the first ambient sound energy information, the first wakeup keyword energy information, the second ambient sound energy information, and the second wakeup keyword energy information, which one of the electronic device 10 and the electronic device 20 is to be woken up.

For example, when the device compensation factor $\theta_1$ of the electronic device 10 is different from the device compensation factor $\theta_2$ of the electronic device 20, and the ambient impact factor $\lambda_1$ of the electronic device 10 is different from the ambient impact factor $\lambda_2$ of the electronic device 20, the third-party device may select the second wakeup keyword energy value algorithm from the first wakeup keyword energy value normalization algorithm, the second wakeup keyword energy value normalization algorithm, and the third wakeup keyword energy value normalization algorithm. When the device compensation factor $\theta_1$ of the electronic device 10 is the same as the device compensation factor $\theta_2$ of the electronic device 20, and the ambient impact factor $\lambda_1$ of the electronic device 10 is different from the ambient impact factor $\lambda_2$ of the electronic device 20, the third-party device may select the first wakeup keyword energy value algorithm from the first wakeup keyword energy value normalization algorithm, the second wakeup keyword energy value normalization algorithm, and the third wakeup keyword energy value normalization algorithm. When the device compensation factor $\theta_1$ of the electronic device 10 is different from the device compensation factor $\theta_2$ of the electronic device 20, and the ambient impact factor $\lambda_1$ of the electronic device 10 is the same as the ambient impact factor $\lambda_2$ of the electronic device 20, the third-party device may select the third wakeup keyword energy value algorithm from the first wakeup keyword energy value normalization algorithm, the second wakeup keyword energy value normalization algorithm, and the third wakeup keyword energy value normalization algorithm. In some embodiments, when the device compensation factor $\theta_1$ of the electronic device 10 is the same as the device compensation factor $\theta_2$ of the electronic device 20, and the ambient impact factor $\lambda_1$ of the electronic device 10 is the same as the ambient impact factor $\lambda_2$ of the electronic device 20, the third-party device may determine, by comparing the first wakeup keyword energy value with the second wakeup keyword energy value, which electronic device is to be woken up.

The foregoing description is merely an example of algorithm selection, and does not constitute a limitation on this embodiment of this application.

In addition, in some embodiments, after receiving the first wakeup message of the electronic device 10, the third-party device determines whether a first timer is started. If the first timer is not started, the third-party device starts the first timer to start timing. If the first timer is started, the third-party device continues to wait to receive a wakeup message. When the timing of the first timer ends, if the third-party device receives, before the timing of the first timer ends, the second wakeup message sent by the electronic device 20, the third-party device determines, based on the first wakeup message and the second wakeup message, which one of the electronic device 10 and the electronic device 20 is to be woken up. Similarly, after receiving the second wakeup message of the electronic device 20, the third-party device determines whether a second timer is started. If the second timer is not started, the third-party device starts the second timer to start timing. If the second timer is started, the third-party device continues to wait to receive a wakeup message. When the timing of the second timer ends, if the third-party device receives, before the timing of the second timer ends, the first wakeup message sent by the electronic device 10, the third-party device determines, based on the first wakeup message and the second wakeup message, which one of the electronic device 10 and the electronic device 20 is to be woken up.

For example, when the third-party device is a router or a network device in a local area network in a multi-device scenario, the second timer and the first timer are a same timer.

For example, when the third-party device is a cloud server, a general-purpose server, or another server, if a user account of the electronic device 10 is the same as a user account of the electronic device 20, the first timer and the second timer may be a same timer. If the user account of the electronic device 20 is different from the user account of the electronic device 10, the first timer and the second timer may be different. For example, the user account may be an account registered with the third-party device when the user uses the electronic device for the first time, for example, an email address or a mobile phone number. Different user accounts correspond to different timers. After timing of a timer corresponding to a user account ends, the third-party device determines, based on wakeup messages that are sent by two or more electronic devices corresponding to the same user account as the timer and that are received before the timing of the timer corresponding to the user account ends, which electronic device is to be woken up. This helps distinguish different multi-device scenarios.

Figure 8:
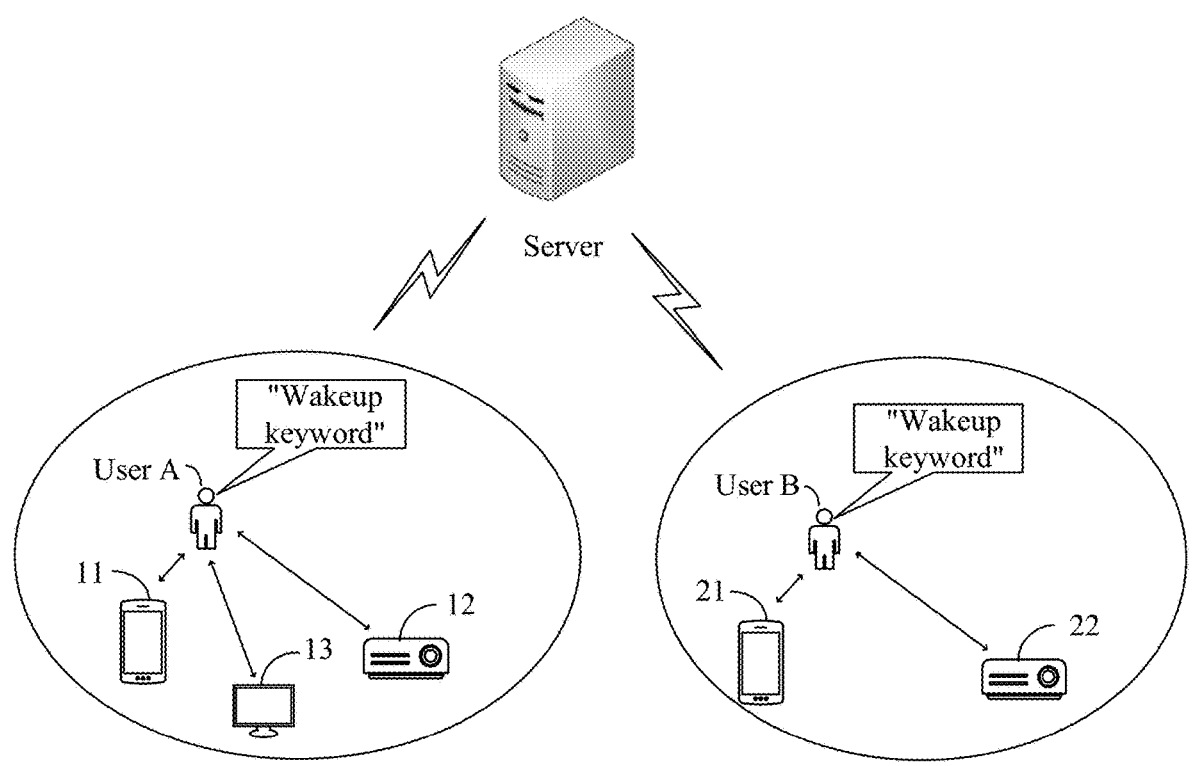
FIG. 8 is a schematic diagram of another multi-device scenario according to an embodiment of this application.

For example, as shown in FIG. 8, a user A and a user B speak a wakeup keyword at the same time at different geographical locations, an electronic device 11, an electronic device 12, and an electronic device 13 receive or collect a sound of speaking the wakeup keyword by the user A, and an electronic device 21 and an electronic device 22 receive or collect a sound of speaking the wakeup keyword by the user B. The user A may set or bind a user account 1 to the electronic device 11, the electronic device 12, and the electronic device 13, and the user B may set or bind a user account 2 to the electronic device 21 and the electronic device 22. After receiving a wakeup message, a server may determine a starting status of a timer corresponding to a user account of an electronic device that sends the wakeup message. When the timer corresponding to the user account of the electronic device that sends the wakeup message is not performing timing, the server starts the corresponding timer. When the timer corresponding to the user account of the electronic device that sends the wakeup message is performing timing, the server collects statistics on the wakeup message under the user account corresponding to the timer. The user account of the electronic device may be carried in the wakeup message. For example, the server may start a first timer for the user account 1, and start a second timer for the user account 2. After timing of the first timer ends, the server processes wakeup messages sent before the timing of the first timer ends by electronic devices (for example, the electronic device 11, the electronic device 12, and/or the electronic device 13) that are set or bound to the user account 1, and determines, based on the wakeup messages sent by the electronic devices that are set or bound to the user account 1, which one of the electronic devices that are set or bound to the user account 1 is to be woken up. After timing of the second timer ends, the server processes wakeup messages sent before the timing of the second timer ends by electronic devices (for example, the electronic device 21 and/or the electronic device 22) that are set or bound to the user account 2, and determines, based on the wakeup messages sent by the electronic devices that are set or bound to the user account 2, which one of the electronic devices that are set or bound to the user account 2 is to be woken up.

For another example, when the third-party device is a cloud server, a general-purpose server, or another server, when a network segment accessed by the electronic device 10 and a network segment accessed by the electronic device 20 are a same network segment, the first timer and the second timer are a same timer. When the network segments accessed by the electronic device 10 and the electronic device 20 are different network segments, the first timer and the second timer may be different timers. That is, different network segments correspond to different timers. For a timer corresponding to a network segment, after timing of the timer corresponding to the network segment ends, the third-party device determines, based on wakeup messages that are sent by two or more electronic devices corresponding to the same network segment as the timer and that are received before the timing of the timer corresponding to the network segment ends, which electronic device is to be woken up. This helps distinguish different multi-device scenarios. It should be noted that electronic devices that access a same network segment may be electronic devices that access a same local area network or home network. For example, if the electronic device 10 and the electronic device 20 access a same network segment, the electronic device 10 and the electronic device 20 access a same local area network or home network.

For example, as shown in FIG. 8, a user A and a user B speak a wakeup keyword at the same time at different geographical locations, an electronic device 11, an electronic device 12, and an electronic device 13 receive or collect a sound of speaking the wakeup keyword by the user A, and an electronic device 21 and an electronic device 22 receive or collect a sound of speaking the wakeup keyword by the user B. For example, the electronic device 11, the electronic device 12, and the electronic device 13 access a network segment 1, and the electronic device 21, and the electronic device 22 access a network segment 2. A wakeup message may carry a network segment accessed by an electronic device, so that after receiving the wakeup message, a server collects statistics on the wakeup message, to improve reliability of waking up an electronic device. For example, the server may start a first timer for the network segment 1, and start a second timer for the network segment 2. After timing of the first timer ends, the server processes wakeup messages sent before the timing of the first timer ends by electronic devices (for example, the electronic device 11, the electronic device 12, and/or the electronic device 13) that access the network segment 1, and determines, based on the wakeup messages sent by the electronic devices that access the network segment 1, which one of the electronic devices that access the network segment 1 is to be woken up. After timing of the second timer ends, the server processes wakeup messages sent before the timing of the second timer ends by electronic devices (for example, the electronic device 21 and/or the electronic device 22) that access the network segment 2, and determines, based on the wakeup messages sent by the electronic devices that access the network segment 2, which one of the electronic devices that access the network segment 2 is to be woken up.

It should be noted that, in some other embodiments of this application, the third-party device may alternatively collect statistics on received wakeup messages with reference to two or more factors of geographical location information, accessed network segments, and set or bound user accounts of electronic devices, to improve reliability of waking up an electronic device by the third-party device.

The foregoing description is merely an example, and a manner in which the third-party device receives the wakeup message is not limited. In this embodiment of this application, the wakeup message sent by the electronic device may alternatively be received in another manner.

It should be further noted that, in this embodiment of this application, the electronic device may alternatively obtain normalized wakeup keyword energy information after normalizing the wakeup keyword energy value, then add the normalized wakeup keyword energy information to the wakeup message, and send the wakeup message to the third-party device, so that the third-party device does not need to normalize the wakeup keyword energy value. This helps reduce signaling overheads. For a manner in which the electronic device normalizes the wakeup keyword energy value, refer to the manner in which the third-party device normalizes the wakeup keyword energy value. Details are not described herein again.

In addition, in some other embodiments, when the preset algorithm is the third wakeup keyword energy value normalization algorithm, the electronic device may not need to send the ambient sound energy information to the third-party device.

Figure 9:
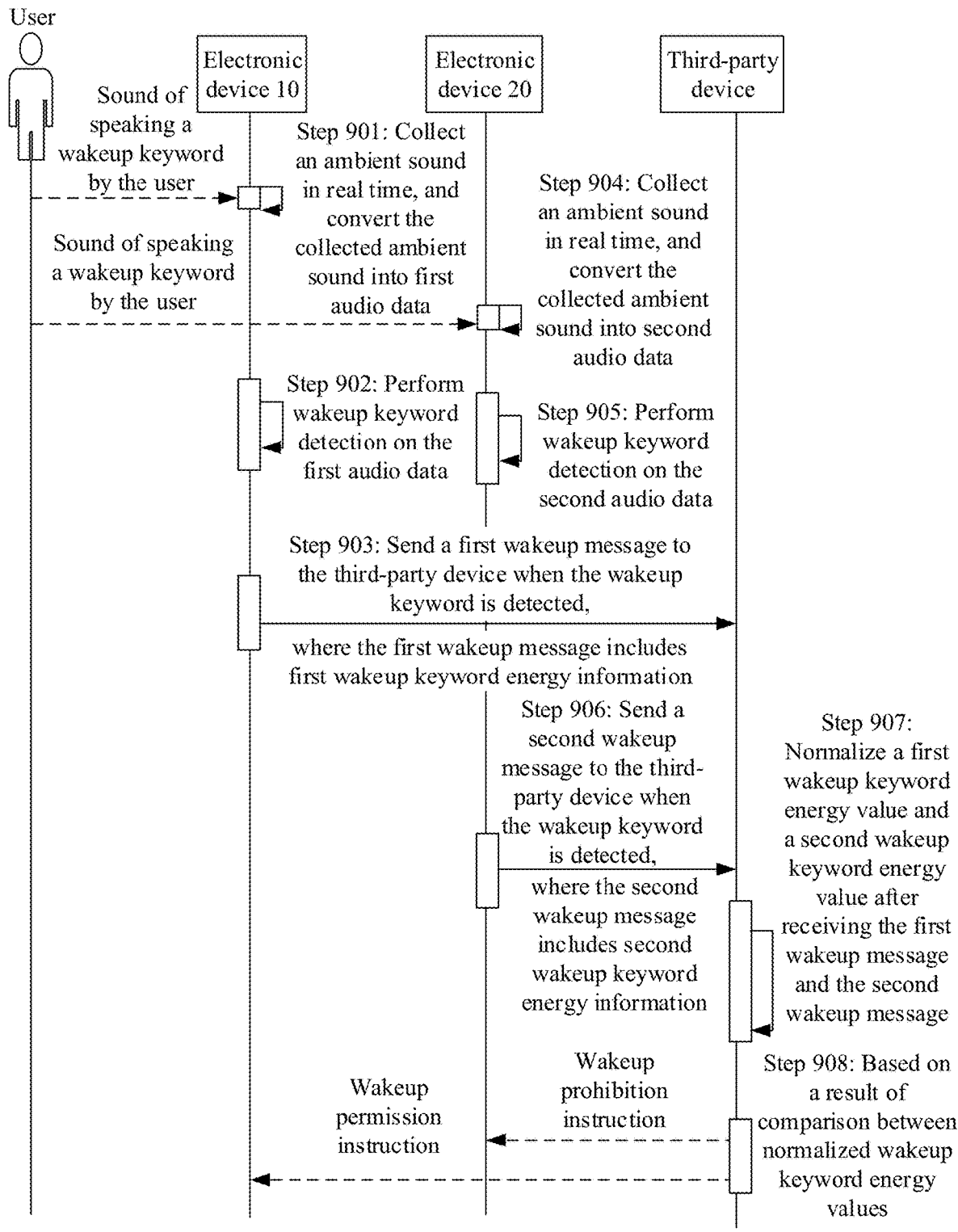
FIG. 9 is a schematic flowchart of another voice wakeup method according to an embodiment of this application.

The multi-device scenario shown in FIG. 1 is used as an example. As shown in FIG. 9, another voice wakeup method in an embodiment of this application includes the following steps.

Step 901: The electronic device 10 collects an ambient sound in real time, and converts the collected ambient sound into first audio data.

Step 902: The electronic device 10 performs wakeup keyword detection on the first audio data.

Step 903: The electronic device 10 sends a first wakeup message to a third-party device when a wakeup keyword is detected, where the first wakeup message includes first wakeup keyword energy information. The first wakeup keyword energy information is used to indicate a first wakeup keyword energy value, and the first wakeup keyword energy value is a magnitude of audio data received energy of the electronic device 10 in a time period in which the wakeup keyword is located.

Step 904: The electronic device 20 collects an ambient sound in real time, and converts the collected ambient sound into second audio data.

Step 905: The electronic device 20 performs wakeup keyword detection on the second audio data.

Step 906: The electronic device 20 sends a second wakeup message to the third-party device when a wakeup keyword is detected, where the second wakeup message includes second wakeup keyword energy information. The second wakeup keyword energy information is used to indicate a second wakeup keyword energy value, and the second wakeup keyword energy value is a magnitude of audio data received energy of the electronic device 20 in a time period in which the wakeup keyword is located.

It should be noted that for specific implementations of step 904, step 905, and step 906, refer to related descriptions in step 901, step 902, and step 903. Details are not described herein again.

It should be further noted that there is no necessary sequence between steps 901, 902, and 903 and steps 904, 905, and 906. For example, step 904 may be performed before step 901, or may be performed after step 901 and before step 902.

Step 907: After receiving the first wakeup message sent by the electronic device 10 and the second wakeup message sent by the electronic device 20, the third-party device separately normalizes the first wakeup keyword energy value and the second wakeup keyword energy value based on a third wakeup keyword energy value normalization algorithm, to obtain a normalized first wakeup keyword energy value and a normalized second wakeup keyword energy value.

The normalized first wakeup keyword energy value satisfies the following expression:

$E_{normalize1} = \theta_1 \times E_{wakeup1}$, where $E_{normalize1}$ is the normalized wakeup keyword energy value of the electronic device 10, $E_{wakeup1}$ is the first wakeup keyword energy value, and $\theta_1$ is a device compensation factor of the electronic device 10. It should be noted that, for a related description of the device compensation factor, refer to the foregoing related description of the device compensation factor.

The normalized second wakeup keyword energy value satisfies the following expression:

$E_{normalize2} = \theta_2 \times E_{wakeup2}$, where $E_{normalize2}$ is the normalized wakeup keyword energy value of the electronic device 20, $E_{wakeup2}$ is the second wakeup keyword energy value, and $\theta_2$ is a device compensation factor of the electronic device 20. It should be noted that, for a related description of the device compensation factor, refer to the foregoing related description of the device compensation factor.

The third wakeup keyword energy value normalization algorithm helps reduce, during voice wakeup of an electronic device, impact of a sound collection capability of the device, and helps improve reliability of waking up an electronic device in a multi-device scenario.

It should be noted that, in this embodiment of this application, for a manner in which the third-party device receives the wakeup message, refer to the manner in which the third-party device receives the wakeup message in the voice wakeup method shown in FIG. 7. Details are not described herein again.

Step 908: The third-party device compares a magnitude of the normalized first wakeup keyword energy value with a magnitude of the normalized second wakeup keyword energy value, sends a wakeup permission instruction to an electronic device that has a larger normalized wakeup keyword energy value in the electronic device 10 and the electronic device 20, and sends a wakeup prohibition instruction to the other electronic device. For example, if the normalized first wakeup keyword energy value is greater than the normalized second wakeup keyword energy value, the wakeup permission instruction is sent to the electronic device 10, and the wakeup prohibition instruction is sent to the electronic device 20.

The foregoing uses only two electronic devices as an example. This embodiment of this application is applicable to a scenario of three or more electronic devices. For a specific implementation, refer to the specific implementation of two electronic devices.

In addition, it should be noted that when receiving only one wakeup message sent by an electronic device, the third-party device sends, without determining, a wakeup permission instruction to the electronic device that sends the wakeup message. This helps simplify an implementation and improve a wakeup rate.

Figure 10:
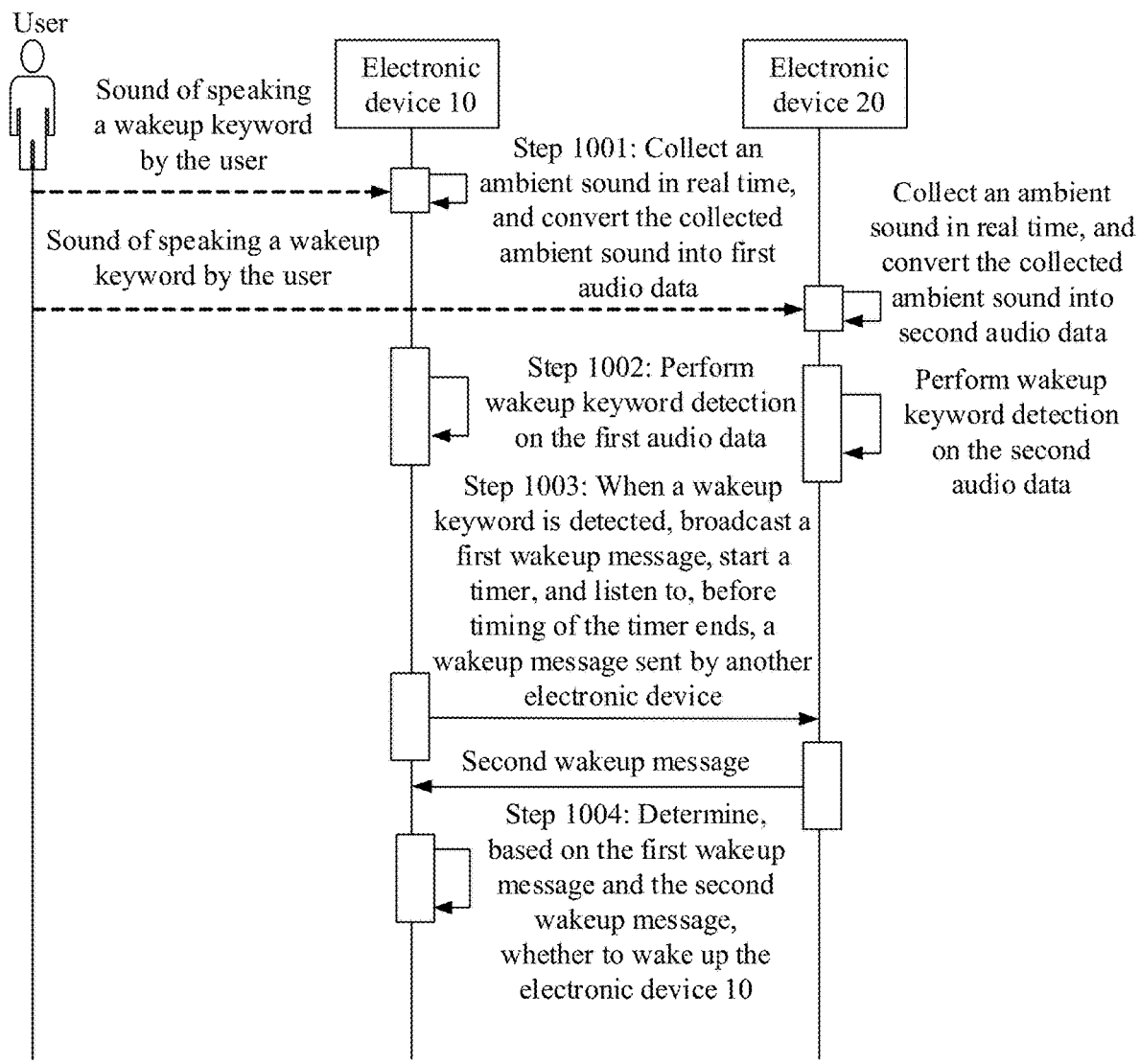
FIG. 10 is a schematic flowchart of another voice wakeup method according to an embodiment of this application.

In some embodiments, for example, when the electronic device 10 is a third-party device, as shown in FIG. 10, a voice wakeup method in an embodiment of this application includes the following steps.

Step 1001: The electronic device 10 collects an ambient sound in real time, and converts the collected ambient sound into first audio data.

Step 1002: The electronic device 10 performs wakeup keyword detection on the first audio data.

For specific implementations of step 1001 and step 1002, refer to related descriptions of step 701 and step 702 in the voice wakeup method shown in FIG. 7. Details are not described herein again.

Step 1003: When a wakeup keyword is detected, the electronic device 10 broadcasts a first wakeup message, starts a timer, and listens to, before timing of the timer ends, a wakeup message broadcast by another electronic device. The first wakeup message includes first wakeup keyword energy information. The first wakeup keyword energy information is used to indicate a first wakeup keyword energy value, and the first wakeup keyword energy value is a magnitude of audio data received energy of the electronic device 10 in a time period in which the wakeup keyword is located. In some embodiments, the first wakeup message may further include first ambient sound energy information. The first ambient sound energy information is used to indicate a first ambient sound energy value, and the first ambient sound energy value is determined by the electronic device 10 based on magnitudes of audio data received energy at P sampling moments in a latest sampling period.

Step 1004: When a second wakeup message sent by the electronic device 20 is received in a time period from when the timing of the timer starts to when the timing of the timer ends, the electronic device 10 determines, based on the first wakeup message and the second wakeup message, whether to wake up the electronic device 10.

For a manner in which the electronic device 10 determines, based on the first wakeup message and the second wakeup message, whether to wake up, refer to the manner in which the third-party device determines, based on the first wakeup message and the second wakeup message, which electronic device is to be woken up. Details are not described herein again.

In some embodiments, voice wakeup of each electronic device may be independent. The electronic device 20 is used as an example. If the electronic device 20 detects a wakeup keyword, for a voice wakeup method for the electronic device 20, refer to the voice wakeup method for the electronic device 10.

In some other embodiments, after determining to wake up, the electronic device 10 may further broadcast a message that the electronic device 10 wakes up. If the electronic device 20 also detects the wakeup keyword but has not woken up, if it is detected that the electronic device 10 wakes up, the electronic device 20 determines not to wake up. Therefore, a process of determining whether to wake up may not be performed. This helps simplify an implementation.

It should be noted that, for a manner of determining, based on the first wakeup message and the second wakeup message, whether to wake up the electronic device 10 in this embodiment of this application, refer to the specific implementation in which the third-party device determines, based on the first wakeup message and the second wakeup message, which one of the electronic device 10 and the electronic device 20 is to be woken up in the voice wakeup method shown in FIG. 7 or FIG. 9. Details are not described herein again.

The foregoing uses only two electronic devices as an example. This embodiment of this application is applicable to a scenario of three or more electronic devices. When the voice wakeup method in this embodiment of this application is applied to a scenario of three or more electronic devices, an electronic device that has a maximum normalized wakeup keyword energy value is woken up. For a specific implementation, refer to the specific implementation of two electronic devices.

When other factors such as an ambient temperature, an ambient humidity, a device placement position, and a distance between devices are considered, corresponding impact factors may be set based on an actual situation as required. For a specific implementation, refer to the specific implementation of the voice wakeup method in which ambient noise and a device hardware capability are considered.

In addition, the foregoing embodiments of this application may be further applied to another voice scenario. For example, when electronic devices receive or collect another voice instruction after detecting a wakeup keyword and woken up, it may be determined, in a multi-device scenario by using the method provided in the embodiments of this application, which electronic device is to respond to the voice instruction. The multi-device scenario shown in FIG. 1 is used as an example. When both the electronic device 10 and the electronic device 20 are woken up, if both receive a voice instruction of "setting an alarm clock" sent by a user, the method provided in the embodiments of this application may be used, to determine which one of the electronic device 10 and the electronic device 20 is to respond to the voice instruction of "setting an alarm clock".

In the embodiments of this application, the foregoing embodiments may be used separately, or may be used in combination with each other, to achieve different technical effects.

In the embodiments provided in this application, the method provided in the embodiments of this application is described from perspectives of an electronic device and a third-party device as execution bodies. To implement functions in the method provided in the foregoing embodiments of this application, the electronic device may include a hardware structure and/or a software module, to implement the functions in a form of the hardware structure, the software module, or the hardware structure plus the software module. Whether one of the functions is implemented by using the hardware structure, the software module, or the hardware structure plus the software module depends on a specific application and a design constraint condition of a technical solution.

Figure 11:
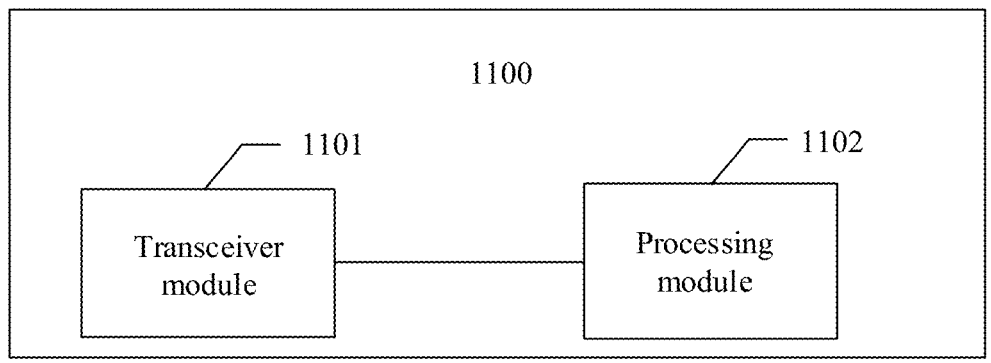
FIG. 11 is a schematic diagram of a structure of a device according to an embodiment of this application.

Based on a same concept, FIG. 11 shows a device 1100 provided in this application. For example, the device 1100 includes a transceiver module 1101 and a processing module 1102.

For example, when the device 1100 is a third-party device, the device 1100 may perform steps performed by the third-party device in the voice wakeup method shown in FIG. 7. For example, the transceiver module 1101 may be configured to perform step 703 and send a wakeup prohibition instruction and/or a wakeup permission instruction, and the like. The processing module 1102 may be configured to perform step 707. The device 1100 may also perform steps performed by the third-party device in the voice wakeup method shown in FIG. 9. For example, the transceiver module 1101 may be configured to perform step 903 and step 906 and send a wakeup prohibition instruction and/or a wakeup permission instruction, and the like. The processing module 1102 may be configured to perform step 907.

For example, when the device 1100 is an electronic device, the device 1100 may perform steps performed by the electronic device 10 or the electronic device 20 in the voice wakeup method shown in FIG. 7. The electronic device 10 is used as an example. The transceiver module 1101 may be configured to perform step 703 and receive a wakeup permission instruction or a wakeup prohibit instruction, and the like. The processing module 1102 may be configured to perform step 702. The device 1100 may also perform steps performed by the electronic device 10 or the electronic device 20 in the voice wakeup method shown in FIG. 9. The electronic device 20 is used as an example. The transceiver module 1101 may be configured to perform step 906 and receive a wakeup permission instruction or a wakeup prohibit instruction, and the like. The processing module 1102 may be configured to perform step 905. The device 1100 may also perform steps performed by the electronic device 10 or the electronic device 20 in the voice wakeup method shown in FIG. 10. The electronic device 10 is used as an example. The transceiver module 1101 may be configured to perform step 1003 and receive a second wakeup message, and the like. The processing module 1102 may be configured to perform step 1002 and the like.

Figure 12:
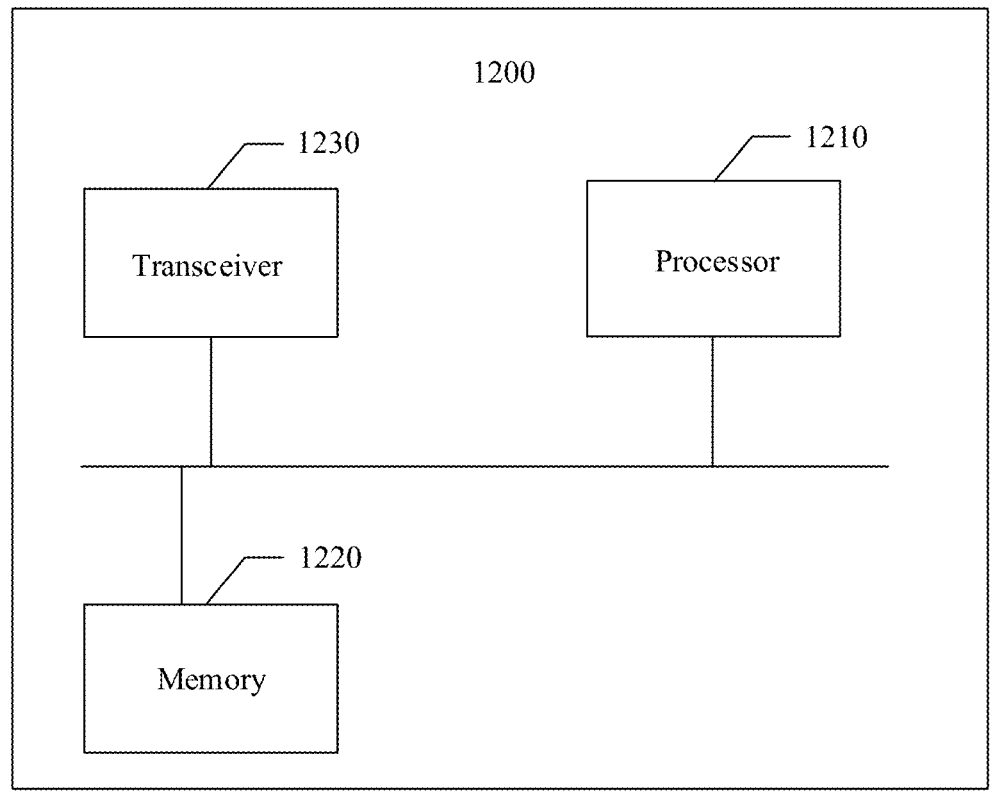
FIG. 12 is a schematic diagram of a structure of another device according to an embodiment of this application.

Based on a same concept, FIG. 12 shows a device 1200 provided in this application. The device 1200 includes at least one processor 1210, memory 1220, and transceiver 1230. The processor 1210 is coupled to the memory 1220 and the transceiver 1230. The coupling in this embodiment of this application is indirect coupling or a communication connection between apparatuses, units, or modules for information exchange between the apparatuses, the units, or the modules, and may be in electrical, mechanical, or other forms. A connection medium between the transceiver 1230, the processor 1210, and the memory 1220 is not limited in this embodiment of this application. For example, in FIG. 12, in this embodiment of this application, the memory 1220, the processor 1210, and the transceiver 1230 may be connected by using a bus. The bus may be classified into an address bus, a data bus, a control bus, and the like.

Specifically, the memory 1220 is configured to store program instructions.

The transceiver 1230 is configured to receive or send data.

The processor 1210 is configured to invoke the program instructions stored in the memory 1220, so that the device 1100 performs steps performed by the third-party device in FIG. 7 or FIG. 9, or performs steps performed by the electronic device 10 or the electronic device 20 in FIG. 7, FIG. 9, or FIG. 10.

In the embodiments of this application, the processor 1210 may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general-purpose processor may be a microprocessor or any conventional processor or the like. The steps of the method disclosed with reference to the embodiments of this application may be directly performed by a hardware processor, or may be performed by using a combination of hardware in the processor and a software module.

In this embodiment of this application, the memory 1220 may be a non-volatile memory, such as a hard disk drive (hard disk drive, HDD) or a solid-state drive (solid-state drive, SSD), or may be a volatile memory (volatile memory), such as a random-access memory (random-access memory, RAM). The memory may be, but is not limited to, any other medium that can be used to carry or store expected program code in a form of instructions or a data structure and that can be accessed by a computer. The memory in this embodiment of this application may alternatively be a circuit or any other apparatus that can implement a storage function, to store program instructions and/or data.

It should be understood that the device 1100 and the device 1200 may be configured to implement the methods shown in FIG. 7, FIG. 9, and FIG. 10 in the embodiments of this application. For related features, refer to the foregoing description. Details are not described herein again.

A person skilled in the art may clearly understand that the embodiments of this application may be implemented by hardware, firmware or a combination thereof. When the embodiments of this application are implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. For example but not for limitation, the computer-readable medium may include a RAM, a ROM, an electrically erasable programmable read-only memory (electrically erasable programmable read-only memory, EEPROM), a compact disc read-only memory (compact disc read-only memory, CD-ROM) or another optical disc storage, a disk storage medium or another magnetic storage device, or any other medium that can be used to carry or store expected program code in a form of instructions or a data structure and that can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (digital subscriber line, DSL) or wireless technologies such as infrared ray, radio and microwave, the coaxial cable, optical fiber/cable, twisted pair, DSL or wireless technologies such as infrared ray, radio and microwave are included in fixation of a medium to which they belong. A disk (disk) and disc (disc) used in the embodiments of this application include a compact disc (compact disc, CD), a laser disc, an optical disc, a digital video disc (digital video disc, DVD), a floppy disk and a Blu-ray disc, where the disk generally copies data in a magnetic manner, and the disc copies data optically through a laser. The foregoing combination should also be included in the protection scope of the computer-readable medium.

In conclusion, what is described above is merely embodiments of this application, but is not intended to limit the protection scope of this application. Any modification, equivalent replacement, or improvement made in accordance with the disclosure of this application shall fall within the protection scope of this application.

What is claimed is:

1. A voice wakeup method, wherein the method comprises:

receiving, by a controlling device, a first wakeup message sent by a first electronic device, wherein the first wakeup message comprises a first wakeup keyword energy value, a first ambient sound energy value and a first device compensation factor, the first wakeup keyword energy value indicates a volume of audio received by the first electronic device in a wakeup keyword time window comprising the time a wakeup keyword is received, the first ambient sound energy value indicates a volume of audio received by the first electronic device in a first ambient sound time window that is a latest ambient sound time window of the first electronic device before the wakeup keyword time window, and the first device compensation factor is used to indicate a sound collection capability of the first electronic device;

receiving, by the controlling device, a second wakeup message sent by a second electronic device, wherein the second wakeup message comprises a second wakeup keyword energy value, a second ambient sound energy value and a second device compensation factor, the second wakeup keyword energy value indicates a volume of audio received by the second electronic device in the wakeup keyword time window, the second ambient sound energy value indicates a volume of audio received by the second electronic device in a second ambient sound time window that is a latest ambient sound time window of the second electronic device before the wakeup keyword time window, the second device compensation factor is used to indicate a sound collection capability of the second electronic device;

normalizing, by the controlling device, the first wakeup keyword energy value based on the first ambient sound energy value and the first device compensation factor, to obtain a first normalized wakeup keyword energy value;

normalizing, by the controlling device, the second wakeup keyword energy value based on the second ambient sound energy value and the second device compensation factor, to obtain a second normalized wakeup keyword energy value; and sending, by the controlling device, a wakeup permission instruction to the first electronic device, and sending a wakeup prohibition instruction to the second electronic device based on the first normalized wakeup keyword energy value and the second normalized wakeup keyword energy value, wherein the first normalized wakeup keyword energy value is larger than the second normalized wakeup keyword energy value.

2. The method according to claim 1, wherein the method further comprises:

receiving, by the controlling device, a third wakeup message sent by a third electronic device, wherein the third wakeup message comprises a third wakeup keyword energy value, a third ambient sound energy value and a controlling device compensation factor, the third wakeup keyword energy value is a volume of audio received by the third electronic device in the wakeup keyword time window, the third ambient sound energy value is a volume of audio received by the third electronic device in a third ambient sound time window that is a latest ambient sound time window of the third electronic device before the wakeup keyword time window, the controlling device compensation factor is used to indicate a sound collection capability of the third electronic device; and normalizing, by the controlling device, the third wakeup keyword energy value based on the third ambient sound energy value and the controlling device compensation factor, to obtain a third normalized wakeup keyword energy value;

wherein the sending, by the controlling device, a wakeup permission instruction to the first electronic device, and sending a wakeup prohibition instruction to the second electronic device further comprises sending a wakeup prohibition instruction to the third electronic device, and is based on the first normalized wakeup keyword energy value, the second normalized wakeup keyword energy value and the third normalized wakeup keyword energy value, wherein the first normalized wakeup keyword energy value is larger than both of the second normalized wakeup keyword energy value and the third normalized wakeup keyword energy value.

3. The method according to claim 1, wherein the first normalized wakeup keyword energy value satisfies the following expression:

$$E_{normalize} = \theta \times (E_{wakeup} \pm \lambda \times E_{ambient}), \text{ wherein}$$

$E_{normalize}$ is the first normalized wakeup keyword energy value, $E_{wakeup}$ is the first wakeup keyword energy value, $E_{ambient}$ is the first ambient sound energy value, $\theta$ is the first device compensation factor, $\lambda$ is a first ambient impact factor, and the first ambient impact factor is used to indicate a degree of impact of an ambient sound energy value on a wakeup keyword energy value.

4. The method according to claim 3, wherein the second normalized wakeup keyword energy value satisfies the expression using at least the second normalized wakeup keyword energy value, the second ambient sound energy value, and the second device compensation factor.

5. The method according to claim 2, wherein the first ambient impact factor is carried in the first wakeup message and sent to the controlling device by the first electronic device; or the first ambient impact factor is preconfigured in the controlling device.

6. The method according to claim 1, further comprising starting a timer, by the controlling device, after receiving the first wakeup message, and wherein the second wakeup message is received by the controlling device after starting the timer and before the timer ends.

7. The method according to claim 2, wherein the controlling device starts a timer after receiving the first wakeup message firstly, and the second wakeup message and the third wakeup message are received by the controlling device before timing of the timer ends.

8. The method according to claim 1, wherein the first electronic device and the second electronic device are connected to a same local area network, or the first electronic device and the second electronic device are associated with a same user account; the controlling device is a server or a network device; the first ambient sound energy value is an average volume of audio received at Q sampling moments in the first ambient sound time window, Q is a positive integer; the second ambient sound energy value is an average volume of audio received at Q sampling moments in the second ambient sound time window.

9. A voice wakeup method implemented by the first electronic device, wherein the method comprises:

collecting an ambient sound in real time and converting the collected ambient sound into audio data;

performing wakeup keyword detection based on the audio data;

when a wakeup keyword is detected, broadcasting a first wakeup message, starting a timer; and monitoring for, before the timer ends, a second wakeup message broadcasted by a second electronic device, wherein the first wakeup message comprises a first wakeup keyword energy value, a first ambient sound energy value and a first device compensation factor, the first wakeup keyword energy value is a volume of audio received by the first electronic device in a wakeup keyword time window comprising the time a wakeup keyword is received, the first ambient sound energy value indicates a volume of audio received by the first electronic device in a first ambient sound time window that is a latest ambient sound time window of the first electronic device before the wakeup keyword time window, and, the first device compensation factor is used to indicate a sound collection capability of the first electronic device, the second wakeup message comprises a second wakeup keyword energy value, a second ambient sound energy value and a second device compensation factor, the second wakeup keyword energy value indicates a volume of audio received by the second electronic device in the wakeup keyword time window, the second ambient sound energy value indicates a volume of audio received by the second electronic device in a second ambient sound time window that is a latest ambient sound time window of the second electronic device before the wakeup keyword time window, the second device compensation factor is used to indicate a sound collection capability of the second electronic device;

when the second wakeup message is received in a time period from when the timer starts to when the timer ends, normalizing the first wakeup keyword energy value based on the first ambient sound energy value and the first device compensation factor, to obtain the first normalized wakeup keyword energy value, and normalizing the second wakeup keyword energy value based on the second ambient sound energy value and the second device compensation factor, to obtain the second normalized wakeup keyword energy value; and waking up when the first normalized wakeup keyword energy value is larger than the second normalized wakeup keyword energy value; and skipping waking up when the first normalized wakeup keyword energy value is smaller than the second normalized wakeup keyword energy value.

10. The method according to claim 9, wherein the first ambient sound energy value is an average volume of audio received by the first electronic device at Q sampling moments in the first ambient sound time window, and Q is a positive integer; the second ambient sound energy value is an average volume of audio received by the second electronic device at Q sampling moments in the second ambient sound time window.

11. The method according to claim 10, wherein the first ambient sound energy value is related to the first ambient sound.

12. The method according to claim 9, wherein the sound collection capability of the first electronic device is related to a sound collection device of the first electronic device.

13. A controlling device, wherein the controlling device comprises a processor and a memory, wherein
the memory stores program instructions; and
when the program instructions are executed, the controlling device is enabled to perform:
receive a first wakeup message sent by a first electronic device, wherein the first wakeup message comprises a first wakeup keyword energy value, a first ambient sound energy value and a first device compensation factor, the first wakeup keyword energy value indicates a volume of audio received by the first electronic device in a wakeup keyword time window comprising the time a wakeup keyword is received, the first ambient sound energy value indicates a volume of audio received by the first electronic device in a first ambient sound time window that is a latest ambient sound time window of the first electronic device before the wakeup keyword time window, and the first device compensation factor is used to indicate a sound collection capability of the first electronic device;
receive a second wakeup message sent by a second electronic device, wherein the second wakeup message comprises a second wakeup keyword energy value, a second ambient sound energy value and a second device compensation factor, the second wakeup keyword energy value indicates a volume of audio received by the second electronic device in the wakeup keyword time window, the second ambient sound energy value indicates a volume of audio received by the second electronic device in a second ambient sound time window that is a latest ambient sound time window of the second electronic device before the wakeup keyword time window, the second device compensation factor is used to indicate a sound collection capability of the second electronic device;
normalize the first wakeup keyword energy value based on the first ambient sound energy value and the first device compensation factor, to obtain a first normalized wakeup keyword energy value;
normalize the second wakeup keyword energy value based on the second ambient sound energy value and the second device compensation factor, to obtain a second normalized wakeup keyword energy value; and
send a wakeup permission instruction to the first electronic device, and send a wakeup prohibition instruction to the second electronic device based on the first normalized wakeup keyword energy value and the second normalized wakeup keyword energy value, wherein the first normalized wakeup keyword energy value is larger than the second normalized wakeup keyword energy value.

14. The controlling device according to claim 13, wherein the first normalized wakeup keyword energy value satisfies the following expression:

$E_{normalize} = \theta \times (E_{wakeup} \pm \lambda \times E_{ambient})$, wherein $E_{normalize}$ is the first normalized wakeup keyword energy value, $E_{wakeup}$ is the first wakeup keyword energy value, $E_{ambient}$ is the first ambient sound energy value, $\theta$ is the first device compensation factor, $\lambda$ is a first ambient impact factor, and the first ambient impact factor is used to indicate a degree of impact of an ambient sound energy value on a wakeup keyword energy value.

15. The controlling device according to claim 14, wherein the first ambient impact factor is carried in the first wakeup message and sent to the controlling device by the first electronic device; or
the first ambient impact factor is preconfigured in the controlling device.

16. The controlling device according to claim 13, wherein the controlling device further starts a timer after receiving the first wakeup message firstly, and wherein the second wakeup message is received by the controlling device after starting the timer and before timing of the timer ends.

17. The controlling device according to claim 13, wherein the first electronic device and the second electronic device are connected to a same local area network, or the first electronic device and the second electronic device are associated with a same user account; the controlling device is a server or a network device; the first ambient sound energy value is an average volume of audio received energy at Q sampling moments in the first ambient sound time window, Q is a positive integer; the second ambient sound energy value is an average volume of audio received energy at Q sampling moments in the second ambient sound time window.

18. A first electronic device, wherein the first electronic device comprises a processor and a memory, wherein
the memory stores program instructions; and
when the program instructions are executed, the first electronic device is enabled to perform:
collect an ambient sound in real time and convert the collected ambient sound into audio;
perform wakeup keyword detection based on the audio;
when a wakeup keyword is detected, broadcast a first wakeup message, start a timer, and listen to, before timing of the timer ends, a second wakeup message broadcasted by a second electronic device, wherein the first wakeup message comprises a first wakeup keyword energy value, a first ambient sound energy value and a first device compensation factor, the first wakeup keyword energy value indicates a volume of audio received by the first electronic device in a wakeup keyword time window comprising the time a wakeup keyword is received, the first ambient sound energy value indicates a volume of audio received by the first electronic device in a first ambient sound time window that is a latest ambient sound time window of the first electronic device before the time, the first device compensation factor is used to indicate a sound collection capability of the first electronic device, the second wakeup message comprises a second wakeup keyword energy value, a second ambient sound energy value and a second device compensation factor, the second wakeup keyword energy value indicates a volume of audio received by the second electronic device in the wakeup keyword time window, the second ambient sound energy value indicates a volume of audio received by the second electronic device in a second ambient sound time window that is a latest ambient sound time window of the second electronic device before the wakeup keyword time window, the second device compensation factor is used to indicate a sound collection capability of the second electronic device;

when the second wakeup message is received in a time period from when the timing of the timer starts to when the timing of the timer ends, normalize the first wakeup keyword energy value based on the first ambient sound energy value and the first device compensation factor, to obtain the first normalized wakeup keyword energy value, and normalize the second wakeup keyword energy value based on the second ambient sound energy value and the second device compensation factor, to obtain the second normalized wakeup keyword energy value; and wake up when the first normalized wakeup keyword energy value is larger than the second normalized wakeup keyword energy value; and skip waking up when the first normalized wakeup keyword energy value is smaller than the second normalized wakeup keyword energy value.

19. The first electronic device according to claim 18, wherein the first ambient sound energy value is an average volume of audio by the first electronic device at Q sampling moments in the first ambient sound time window, and Q is a positive integer; the second ambient sound energy value is an average volume of audio received by the first electronic device at Q sampling moments in the second ambient sound time window.

20. The first electronic device according to claim 19, wherein the first ambient sound energy value is related to the first ambient sound.

* * * * *